United States Patent
Kim et al.

(10) Patent No.: US 12,150,037 B2
(45) Date of Patent: Nov. 19, 2024

(54) METHOD AND APPARATUS FOR TRANSMITTING AND RECEIVING SYSTEM INFORMATION BLOCK IN WIRELESS COMMUNICATION SYSTEM

(71) Applicant: Samsung Electronics Co., Ltd., Gyeonggi-do (KR)

(72) Inventors: Youngbum Kim, Gyeonggi-do (KR); Jinkyu Kang, Gyeonggi-do (KR); Taehyoung Kim, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 408 days.

(21) Appl. No.: 17/610,976

(22) PCT Filed: May 13, 2020

(86) PCT No.: PCT/KR2020/006254
§ 371 (c)(1),
(2) Date: Nov. 12, 2021

(87) PCT Pub. No.: WO2020/231161
PCT Pub. Date: Nov. 19, 2020

(65) Prior Publication Data
US 2022/0264430 A1   Aug. 18, 2022

(30) Foreign Application Priority Data

May 13, 2019   (KR) .................. 10-2019-0055888

(51) Int. Cl.
*H04W 72/04*   (2023.01)
*H04W 16/10*   (2009.01)
(Continued)

(52) U.S. Cl.
CPC .......... *H04W 48/12* (2013.01); *H04W 72/23* (2023.01)

(58) Field of Classification Search
CPC . H04W 48/12; H04W 48/08; H04W 56/0015; H04W 4/70; H04W 72/23;
(Continued)

(56) References Cited

U.S. PATENT DOCUMENTS 10,390,320 B2   8/2019   Xiong et al.
2015/0181575 A1   6/2015   Ng et al.
(Continued)

FOREIGN PATENT DOCUMENTS

KR   10-2016-0079860   7/2016
KR   10-2017-0039694   4/2017
(Continued)

OTHER PUBLICATIONS

InterDigital Communications, "On Synchronization Signal Block and Indication", R1-1705498, 3GPP TSG RAN WG1 Meeting #88bis, Apr. 3-7, 2017, 5 pages.
(Continued)

*Primary Examiner* — Moustapha Diaby
(74) *Attorney, Agent, or Firm* — The Farrell Law Firm, P.C.

(57) ABSTRACT

The present disclosure relates to a communication technique for combining, with IoT technology, a 5G communication system for supporting a higher data transmission rate than a 4G system, and a system therefor. The present disclosure may be applied to intelligent services, such as smart homes, smart buildings, smart cities, smart cars or connected cars, health care, digital education, retail, and security and safety related services, on the basis of 5G communication technologies and IoT-related technologies. According to the present disclosure, in a method for obtaining a system information block (SIB) of a terminal in a wireless communication system, a base station may obtain a transmitted synchronization signal block (SSB), obtain a master infor-
(Continued)

mation block (SIB) from the SSB, obtain a master information block (MIB), and obtain an SIB related to machine type communication (MTC) on the basis of information obtained from at least one of the MIB or SSB related resource.

14 Claims, 17 Drawing Sheets

(51) Int. Cl.
 *H04W 16/14* (2009.01)
 *H04W 28/16* (2009.01)
 *H04W 48/12* (2009.01)
 *H04W 72/23* (2023.01)

(58) Field of Classification Search
 CPC .. H04W 56/00; H04B 7/2656; H04J 11/0073; H04J 11/0076
 See application file for complete search history.

(56) References Cited

U.S. PATENT DOCUMENTS

| | | | |
|---|---|---|---|
| 2015/0341957 A1 | 11/2015 | Tang et al. | |
| 2016/0315752 A1* | 10/2016 | Chen | H04L 5/14 |
| 2017/0230951 A1 | 8/2017 | Xiong et al. | |
| 2017/0311250 A1* | 10/2017 | Rico Alvarino | H04W 48/18 |
| 2018/0192383 A1 | 7/2018 | Nam et al. | |
| 2019/0068348 A1 | 2/2019 | Nam | |
| 2019/0082434 A1 | 3/2019 | Young | |
| 2020/0120634 A1* | 4/2020 | Lee | H04W 74/0833 |

FOREIGN PATENT DOCUMENTS

| | | |
|---|---|---|
| KR | 1020170139531 | 12/2017 |
| KR | 10-2018-0041769 | 4/2018 |
| KR | 1020180080700 | 7/2018 |
| WO | WO 2018/171924 | 9/2018 |
| WO | WO 2019/009673 | 1/2019 |

OTHER PUBLICATIONS

European Seach Report dated May 9, 2022 issued in counterpart application No. 20805631.7-1216, 11 pages.
PCT/ISA/210 Search Report issued on PCT/KR2020/006254, Aug. 11, 2020, pp. 5.
PCT/ISA/237 Written Opinion issued on PCT/KR2020/006254, Aug. 11, 2020, pp. 5.
Ericsson, 'Enhancements to initial access procedure', R1-1907455, 3GPP TSG RAN WG1 Meeting #97, Reno, USA, May 4, 2019, pp. 14.
Korean Office Action dated May 30, 2024 issued in counterpart application No. 10-2019-0055888, 9 pages.

* cited by examiner

METHOD AND APPARATUS FOR TRANSMITTING AND RECEIVING SYSTEM INFORMATION BLOCK IN WIRELESS COMMUNICATION SYSTEM

PRIORITY

This application is a National Phase Entry of PCT International Application No. PCT/KR2020/006254, which was filed on May 13, 2020, and claims priority to Korean Patent Application No. 10-2019-0055888, which was filed on May 13, 2019, the entire content of each of which is incorporated herein by reference.

TECHNICAL FIELD

The disclosure relates to a cellular wireless communication system and, more specifically, to a method for transmitting a system information block to a terminal by a base station.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system is considered to be implemented in higher frequency (mmWave) bands (e.g., 60 GHz bands), so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

5G communication systems are evolving so as to be able to support various services such as enhanced mobile broadband (eMBB), massive machine type communication (mMTC), and ultra reliability low latency communication (URLLC), and in order to provide various services, base stations need to broadcast configuration information for terminals that provide such services.

DISCLOSURE OF INVENTION

Technical Problem

A technical problem to be solved by the disclosure is to provide a method and an apparatus for transmitting/receiving a system information block efficiently for various services in a mobile communication system.

Solution to Problem

In order to solve the above-mentioned problem, the disclosure may provide a method for obtaining a system information block (SIB) by a terminal of a wireless communication system, the method including: obtaining a synchronization signal block (SSB) transmitted by a base station; obtaining a master information block (MIB) from the SSB; and obtaining an SIB related to machine type communication (MTC), based on information obtained from at least one of the MIB or a resource related to the SSB.

In addition, the method may further include identifying whether the SIB related to MTC is transmitted, based on at least one of information obtained from the MIB, the SSB, or the resource related to the SSB.

In addition, the method may further include: identifying a resource region related to the SSB, based on a resource on which the SSB is transmitted; and obtaining information for obtaining the SIB related to MTC from the resource region related to the SSB.

In addition, the information obtained from at least one of the MIB or the resource related to the SSB may include at least one of configuration information of a control resource set (CORESET) or configuration information of a search space in which downlink control information (DCI) for scheduling the SIB related to MTC is transmitted. The information obtained from at least one of the MTB or the resource related to the SSB may be information for scheduling a physical downlink shared channel (PDSCH) used to transmit the SIB related to MTC.

In addition, a method for transmitting a system information block (SIB) by a base station of a wireless communication system may include: generating a master information block (MIB); transmitting a synchronization signal block (SSB), based on the generated MIB; generating an SIB related to machine type communication (MTC); and transmitting the SIB related to MTC, wherein a resource on which the SIB related to MTC is transmitted is indicated based on information obtained from at least one of the MIB or a resource related to the SSB.

In addition, a terminal of a wireless communication system may include: a transceiver; and a controller that is connected to the transceiver and performs control to obtain a synchronization signal block (SSB) transmitted by a base station, obtain a master information block (MIB) from the SSB, and obtain a system information block (SIB) related to machine type communication (MTC), based on information obtained from at least one of the MIB or a resource related to the SSB.

In addition, a base station of a wireless communication system may include: a transceiver; and a controller that is connected to the transceiver and performs control to generate a master information block (MIB), transmit a synchronization signal block (SSB), based on the generated MIB, generate a system information block (SIB) related to machine type communication (MTC), and transmit the SIB related to MTC, wherein a resource on which the SIB related to MTC is transmitted is indicated based on information obtained from at least one of the MIB or a resource related to the SSB.

Advantageous Effects of Invention

The disclosure provides a method and an apparatus for transmitting/receiving a system information block efficiently in a mobile communication system such that a node and a system supposed to transmit a downlink signal can simultaneously transmit system information blocks for various services and can efficiently operate the same.

MODE FOR THE INVENTION

Figure 1:
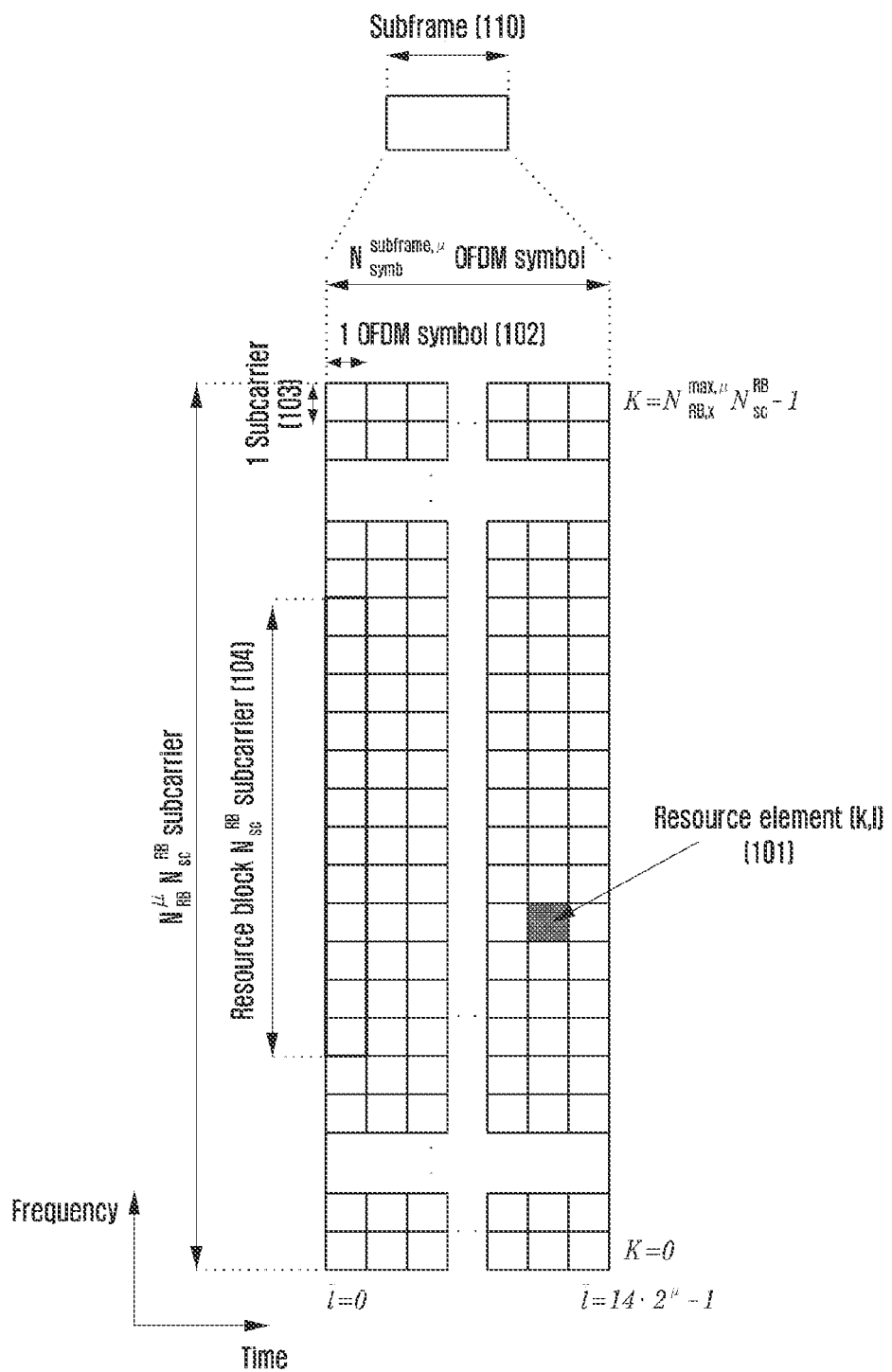
FIG. 1 is a diagram illustrating a basic structure of a time-frequency domain which is a wireless resource region of a 5G communication system.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink" refers to a radio link via which a base station transmits a signal to a terminal, and an "uplink" refers to a radio link via which a terminal transmits a signal to a base station. Further, although the following description may be directed to an LTE or LTE-A system by way of example, embodiments of the disclosure may also be applied to other communication systems having similar technical backgrounds or channel types to the embodiments of the disclosure. Examples of other communication systems may include 5th generation mobile communication technologies (5G, new radio, NR) developed beyond LTE-A, and in the following description, the "5G" may be a concept that covers exiting LTE, LTE-A, and other similar services. In addition, based on determinations by those skilled in the art, the disclosure may be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, an embodiment of the disclosure will be described in detail with reference to the accompanying drawings. Hereinafter, a method and an apparatus proposed in an embodiment of the disclosure provides an embodiment of the disclosure, based on an mMTC service as an example. However, the method and the apparatus are not limited in its application to each embodiment, and can also be used for a method of determining whether there is system information block information corresponding to another additional service, and a method of configuring a resource of a PDSCH including the corresponding system information block information by using all of one or more embodiments proposed in the disclosure or a combination of some embodiments. Therefore, an embodiment of the disclosure may be applied through partial modification without departing too far from the scope of the disclosure according to the determination of a person skilled in the art.

In addition, in describing the disclosure, a detailed description of relevant functions or configurations incorporated herein will be omitted when it may make the subject matter of the disclosure rather unclear. The terms as described below are defined in consideration of the functions in the disclosure, and the meaning of the terms may vary according to the intention of a user or operator, convention, or the like. Therefore, the definitions of the terms should be made based on the contents throughout the specification.

Wireless communication system have developed into be broadband wireless communication systems that provide a high speed and high quality packet data service like the communication standards, such as high-speed packet access (HSPA), long-term evolution (LTE or evolved universal terrestrial radio access (E-UTRA)), LTE-advanced (LTE-A), and LTE-Pro of 3GPP, high rate packet data (HRPD) and ultra-mobile broadband (UMB) of 3GPP2, and 802.16e of IEEE, beyond a voice-based service provided at the initial stage.

An LTE system, which is a representative example of a broadband wireless communication system, employs an orthogonal frequency division multiplexing (OFDM) scheme for a downlink (DL), and employs a single carrier frequency division multiple access (SC-FDMA) scheme for an uplink (UL). Uplink denotes a wireless link for transmitting data or a control signal by a terminal (user equipment (UE) or mobile station (MS)) to a base station (BS or eNode B (eNB)) and downlink denotes a wireless link for transmitting data or a control signal by a base station to a terminal. In a multiple access scheme described above, generally, time-frequency resources for carrying data or control information are allocated and managed in a manner to prevent overlapping of the resources between users, that is, to establish orthogonality so as to distinguish data or control information of each user.

A 5G communication system, which is a post-LTE communication system, is required to support a service satisfying all various requirements so as to freely reflect various requirements from a user and a service provider. Enhanced mobile broadband (eMBB), massive machine type communication (mMTC), ultra-reliability low-latency communication (URLLC), etc. may be considered as a service for a 5G communication system.

The purpose of eMBB is to provide a more improved data rate than that supported by the conventional LTE, LTE-A, or LTE-Pro. For example, in a 5G communication system, eMBB is required to provide a peak data rate of 10 Gbps for uplink and a peak data rate of 20 Gbps for downlink in view of a single base station. Furthermore, a 5G communication system is required to provide both a peak data rate and an increased user-perceived data rate of a terminal. In order to meet these requirements described above, the improvement of various transmission/reception technologies including a further enhanced multiple antenna (multi-input and multi-output (MIMO)) transmission technology may be required. In addition, while, in an LTE system, a signal is transmitted using a maximum 20 MHz transmission bandwidth within a 2 GHz band, in a 5G communication system, a frequency bandwidth wider than 20 MHz is used within a frequency band of 3-6 GHz or a frequency band of 6 GHz or higher, so that a data transfer rate required for a 5G communication system can be satisfied.

Meanwhile, mMTC has been considered to support an application service, such as the Internet of Things (IoT), in a 5G communication system. mMTC requires the support of massive terminal access in a cell, the improvement of terminal coverage, improved battery lifetime, terminal cost reduction, etc. in order to efficiently provide the Internet of Things. Since the Internet of Things is mounted in various sensors and devices to provide a communication function, mMTC is required to support a large number of terminals (e.g., 1,000,000 terminals/km$^2$) in a cell. In addition, a terminal supporting mMTC requires a wider coverage compared to other services provided in a 5G communication system because it is highly probable that the terminal is located in a radio shadow area, such as the basement of a building, which a cell fails to cover, due to the nature of the service. A terminal supporting mMTC is required to be inexpensive and to have a very long battery lifetime of, for example, 10-15 years, because it is difficult to often change the battery of the terminal.

Lastly, URLLC is a cellular-based wireless communication service which is used for a particular purpose (mission-critical). For example, a service used in remote control for robots or machinery, industrial automation, unmanned aerial vehicles, remote health care, emergency alerts, etc. may be considered therefor. Therefore, communication provided by URLLC is required to provide very low latency and very high reliability. For example, a service supporting URLLC may be required to satisfy both requirements including a wireless access latency time (air interface latency) shorter than 0.5 milliseconds and a packet error rate of $10^{-5}$ or lower. Therefore, for a service supporting URLLC, a 5G system is required to provide a transmission time interval (TTI) shorter than those of other services, and allocate a wide domain of resources in a frequency band to secure the reliability of a communication link.

The three services of a 5G communication system (hereinafter, this can be used together with a 5G system), that is, eMBB, URLLC, and mMTC, may be multiplexed and then transmitted in a single system. In order to satisfy different requirements of the services, different transmission/reception techniques and different transmission/reception parameters may be used for the services, respectively.

Hereinafter, a frame structure of a 5G system will be described in detail with reference to the drawings.

FIG. 1 is a diagram illustrating a basic structure of a time-frequency domain which is a wireless resource region of a 5G system.

In FIG. 1, the transverse axis indicates a time domain, and the longitudinal axis indicates a frequency domain. A basic unit of the resources in the time-frequency domain is a resource element (RE) 101, and may be defined by one orthogonal frequency division multiplexing (OFDM) symbol 102 (or a discrete Fourier transform spread OFDM (DFT-s-OFDM) symbol) in the time axis and one subcarrier 103 in the frequency axis. In the frequency domain, $N_{sc}^{RB}$ number (e.g., 12) of consecutive REs may configure one resource block (RB) 104. In addition, in the time domain, $N_{symb}^{subframe}$ number of consecutive OFDM symbols may configure one subframe 110.

Figure 2:
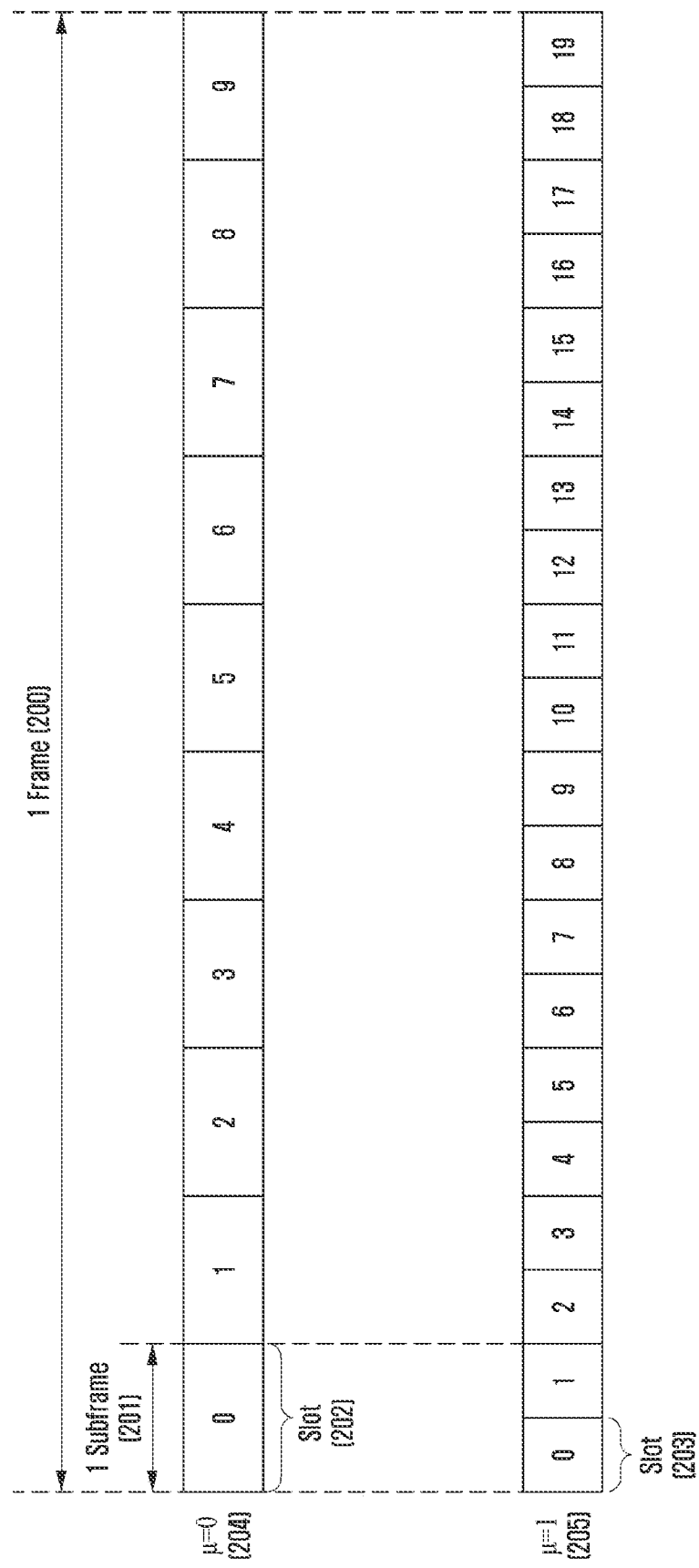
FIG. 2 is a diagram illustrating a slot structure considered in a 5G communication system.

FIG. 2 is a diagram illustrating a slot structure considered in a 5G system.

In FIG. 2, an example of a structure of a frame 200, a subframe 201, and a slot 202 is illustrated. The one frame 200 may be defined as 10 ms. The one subframe 201 may be defined as 1 ms, and thus the one frame 200 may be configured by a total of 10 subframes 201. Furthermore, the one slot 202 or 203 may be defined as 14 OFDM symbols (i.e., the number ($N_{symb}^{slot}$) of symbols per one slot=14). The one subframe 201 may be configured by the one slot 202 or multiple slots 203, and the number of slots 202 or 203 per one subframe 201 may vary according to a configuration value p 204 or 205 of subcarrier spacing.

In the example of FIG. 2, respective slot structures of a case of μ=0 (204) and a case of μ=1 (205) are illustrated as a subcarrier spacing configuration value. In the case of μ=0 (204), the one subframe 201 may be configured by the one slot 202, and in the case of μ=1 (205), the one subframe 201 may be configured by two slots 203. That is, the number ($N_{slot}^{subframe,\mu}$) of slots per one subframe may vary according to a configuration value p of a subcarrier spacing, and the number ($N_{slot}^{frame,\mu}$) of slots per one frame may vary accordingly. $N_{slot}^{subframe,\mu}$ and $N_{slot}^{frame,\mu}$ according to each subcarrier spacing configuration p may be defined as shown in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In a 5G wireless communication system, a synchronization signal block (this can be used together with an SSB, an SS block, an SS/PBCH block, etc.) may be transmitted for an initial access, and the synchronization signal block may be configured by a primary synchronization signal (PSS), a secondary synchronization signal (SSS), and a physical broadcast channel (PBCH). In an initial access stage at which a terminal accesses a system for the first time, the terminal first obtains downlink time and frequency domain synchronization from a synchronization signal through a cell search, and obtains a cell ID. The synchronization signal includes a PSS and an SSS. The terminal receives a PBCH transmitting a master information block (MIB) from a base station, and obtains transmission/reception related system information, such as a system bandwidth or relevant control information, and a basic parameter value.

A synchronization signal is a signal serving as a criterion of a cell search, and a subcarrier spacing suitable for a channel environment, such as a phase noise, for each frequency band is applied to a synchronization signal to be transmitted. A 5G base station may transmit multiple synchronization signal blocks according to the number of analog beams to be managed. A PSS and an SSS may be mapped and transmitted over 12 RBs, and a PBCH may be mapped and transmitted over 24 RBs. A structure in which a synchronization signal and a PBCH are transmitted in a 5G communication system will be described below.

Figure 3:
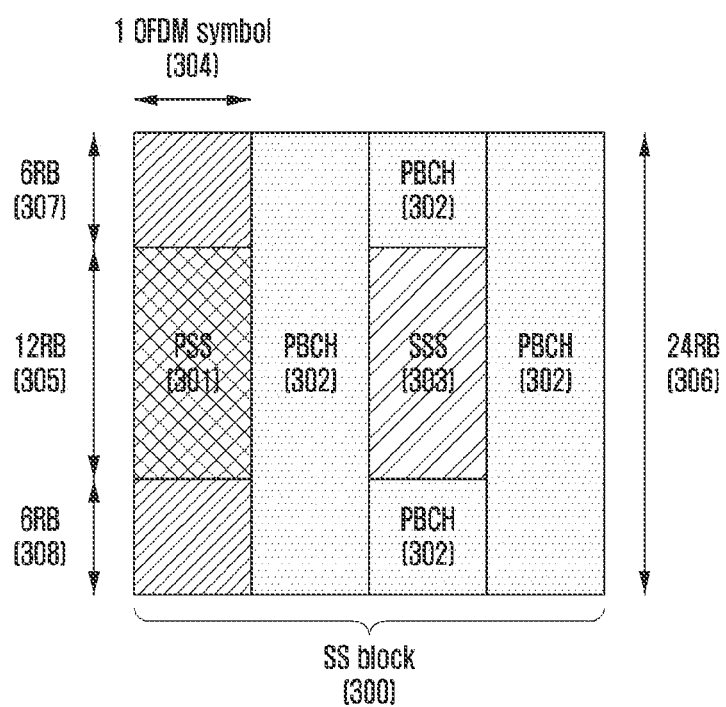
FIG. 3 is a diagram illustrating a synchronization signal block considered in a 5G communication system.

FIG. 3 is a diagram illustrating a synchronization signal block considered in a 5G communication system.

According to FIG. 3, a synchronization signal block 300 is configured by a PSS 301, an SSS 303, a PBCH (a broadcast channel) 302.

As illustrated therein, the synchronization signal block 300 is mapped to four OFDM symbols on the time axis. The PSS 301 and the SSS 303 may be transmitted on 12 RBs 305 on the frequency axis and on the first and third OFDM symbols on the time axis, respectively. In a 5G system, a total of 1008 different cell IDs may be defined, the PSS 301 may have three different values according to a physical layer ID of a cell, and the SSS 303 may have 336 different values. A terminal may obtain one of the 1008 cell IDs through detection of the PSS 301 and the SSS 303, and a combination thereof. This may be expressed by Equation 1 below.

$$N_{ID}^{cell}=3N_{ID}^{(1)}+N_{ID}^{(2)} \quad \text{[Equation 1]}$$

$N^{(1)}_{ID}$ may be estimated from the SSS 303, and has a value of 0 to 335. $N^{(2)}_{ID}$ may be estimated from the PSS 301, and has a value of 0 to 2. A value of $N^{cell}_{ID}$, which is a cell ID, may be estimated by a combination of $N^{(1)}_{ID}$ and $N^{(2)}_{ID}$.

The PBCH 302 may be transmitted on a resource including opposite 6 RBs 307 and 308 and remaining after excluding middle 12 RBs, on which the SSS 303 is transmitted, from the second to fourth OFDM symbols of the SS block on the time axis and 24 RBs 306 on the frequency axis. Various pieces of system information, which are called an MIB, may be transmitted through the PBCH 302 and, more specifically, the MIB includes information as shown in Table 2 below, and a PBCH payload and a PBCH demodulation reference signal (DMRS) include additional information below.

TABLE 2

```
MIB ::=                      SEQUENCE {
    systemFrameNumber            BIT STRING (SIZE (6)),
    subCarrierSpacingcommon      ENUMERATED {secs15or60,
scs30or120},
    ssb-SubcarrierOffset         INTEGER (0..15),
    dmrs-TypeA-Position          ENUMERATED {pos2, pos3},
    pdcch-ConfigSIB1             PDCCH-ConfigSIB1,
    cellBarred                   ENUMERATED {barred, notBarred},
    intraFreqReselection         ENUMERATED {allowed, notAllowed},
    spare                        BIT STRING (SIZE (1))
}
```

Synchronization signal block information: A frequency domain offset of a synchronization signal block is indicated through four bits (ssb-SubcarrierOffset) in an MIB. An index of a synchronization signal block including the PBCH may be indirectly obtained through decoding a PBCH DMRS and the PBCH. More specifically, in a frequency band of 6 GHz or lower, three bits obtained through decoding of a PBCH DMRS indicate a synchronization signal block index, and in a frequency band of 6 GHz or higher, three bits obtained through decoding of a PBCH DMRS and three bits obtained through decoding of a PBCH included in a PBCH payload, that is, a total of six bits, indicate an index of a synchronization signal block including the PBCH.

Physical downlink control channel (PDCCH) information: A subcarrier spacing of a common downlink control channel is indicated through one bit (subCar-rierSpacingCommon) in an MIB, and time-frequency resource configuration information of a control resource set (CORESET) and a search space (SS) is indicated through eight bits (pdcch-ConfigSIB1).

System frame number (SFN): Six bits (systemFrameNumber) in an MIB are used to indicate a part of an SFN. Four least significant bits (LSBs) of an SFN are included in a PBCH payload, and thus a terminal may indirectly obtain same through PBCH decoding.

Timing information in radio frame: A terminal may indirectly identify whether a synchronization signal block has been transmitted in the first or second half frame in a radio frame, by using a synchronization signal block index described above, and one bit (a half frame) which is included in a PBCH payload and is obtained through PBCH decoding.

The transmission bandwidth (12 RBs 305) of the PSS 301 and the SSS 303 and the transmission bandwidth (24 RBs 306) of the PBCH 302 are different from each other.

Therefore, opposite six RBs 307 and 308 remain after excluding middle 12 RBs, on which the PSS 301 is transmitted, from the first OFDM symbol on which the PSS 301 is transmitted within the transmission bandwidth of the PBCH 302, and these regions may be used to transmit another signal, or may be empty.

A synchronization signal block may be transmitted using the same analog beam. That is, the PSS 301, the SSS 303, and the PBCH 302 may be transmitted using the same analog beam. Analog beams are unable to be applied differently along the frequency axis, and thus the same analog beam is applied on all frequency axis RBs in a particular OFDM symbol to which a particular analog beam is applied. That is, four OFDM symbols on which the PSS 301, the SSS 303, and the PBCH 302 are transmitted may be transmitted using the same analog beam.

Figure 4:
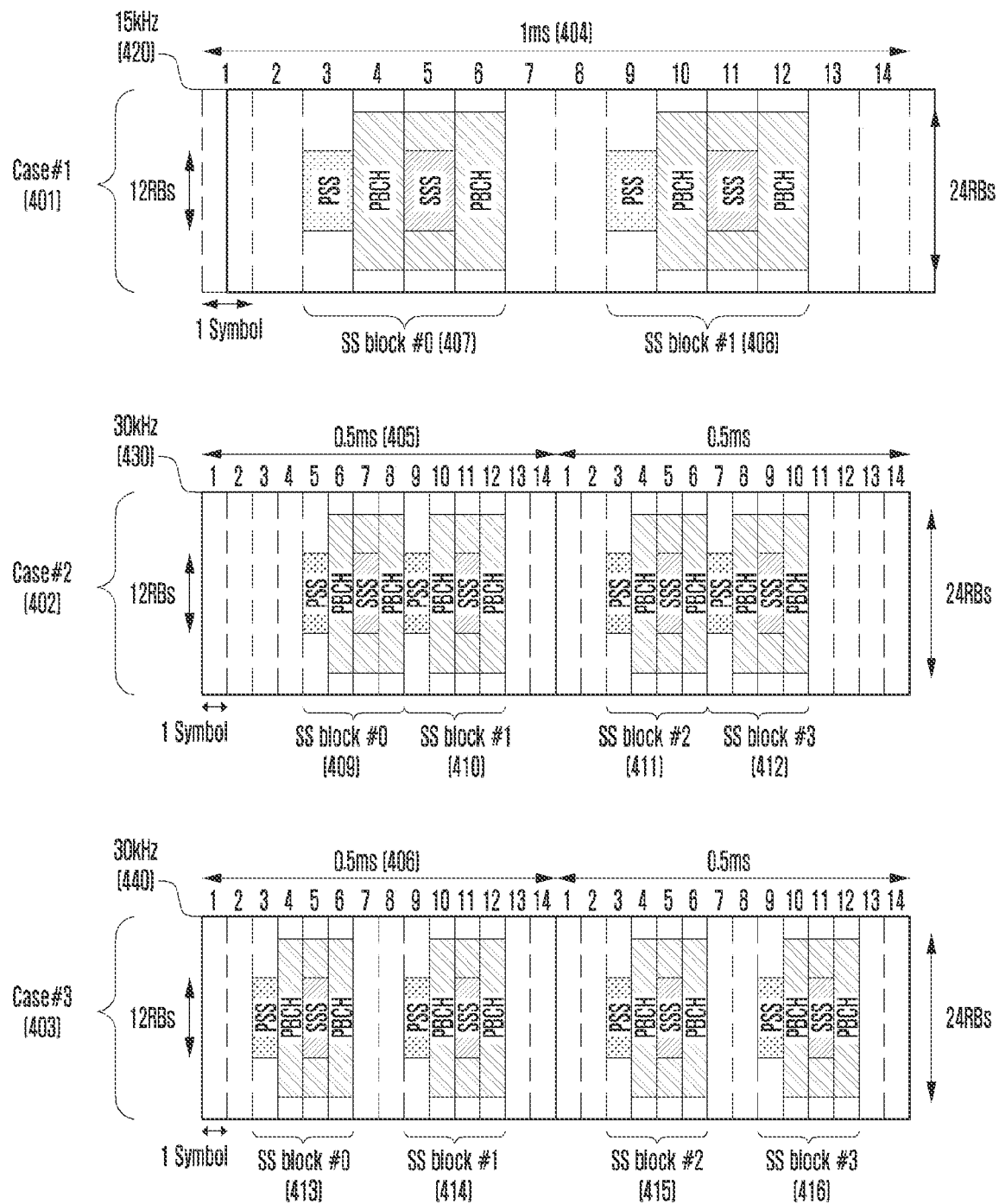
FIG. 4 is a diagram illustrating cases of transmission of a synchronization signal block in a frequency band of 6 GHz or lower considered in a 5G communication system.

FIG. 4 is a diagram illustrating cases of transmission of a synchronization signal block in a frequency band of 6 GHz or lower considered in a 5G communication system. In a 5G communication system, in a frequency band of 6 GHz or lower, a subcarrier spacing (SCS) of 15 kHz 420 and a subcarrier spacing of 30 kHz 430 and 440 may be used in transmission of a synchronization signal block. In relation to the subcarrier spacing of 15 kHz, one transmission case (case #1 401) relating to a synchronization signal block exists, and in relation to the subcarrier spacing of 30 kHz, two transmission cases (case #2 402 and case #3 403) relating to a synchronization signal block exist.

In case #1 401 of the subcarrier spacing of 15 kHz 420, a maximum of two synchronization signal blocks may be transmitted within a time interval of 1 ms (404) (or this corresponds to one slot length in a case where one slot is configured by 14 OFDM symbols). In one example of FIG. 4, synchronization signal block #0 407 and synchronization signal block #1 408 are illustrated. Synchronization signal block #0 407 may be mapped to four consecutive symbols from the third OFDM symbol, and synchronization signal block #1 408 may be mapped to four consecutive symbols from the ninth OFDM symbols.

Different analog beams may be applied to synchronization signal block #0 407 and synchronization signal block #1 408. Therefore, the same beam may be applied to the third to sixth OFDM symbols to which synchronization signal block #0 407 is mapped, and the same beam may be applied to the ninth to twelfth OFDM symbols to which synchronization signal block #1 408 is mapped. Which beam is to be used in the seventh, eighth, thirteenth, and fourteenth OFDM symbols to which no synchronization signal block is mapped may be freely determined under a determination of a base station.

In case #2 402 of the subcarrier spacing of 30 kHz 430, a maximum of two synchronization signal blocks may be transmitted within a time interval of 0.5 ms (405) (or this corresponds to one slot length in a case where one slot is configured by 14 OFDM symbols), and accordingly, a maximum of four synchronization signal blocks may be transmitted within a time interval of 1 ms (or this corresponds to two-slot length in a case where one slot is configured by 14 OFDM symbols) In one example of FIG. 4, a case where synchronization signal block #0 409, synchronization signal block #1 410, synchronization signal block #2 411, and synchronization signal block #3 412 are transmitted in 1 ms (i.e., two slots) is illustrated. Synchronization signal block #0 409 and synchronization signal block #1 410 may be mapped from the fifth OFDM symbol and the ninth OFDM symbol of the first slot, respectively, and synchronization signal block #2 411 and synchronization signal block #3 412 may be mapped from the third OFDM symbol and the seventh OFDM symbol of the second slot, respectively.

Different analog beams may be applied to synchronization signal block #0 409, synchronization signal block #1 410, synchronization signal block #2 411, and synchronization signal block #3 412. Therefore, the same analog beam may be applied to each of the fifth to eighth OFDM symbols of the first slot, on which synchronization signal block #0 409 is transmitted, the ninth to twelfth OFDM symbols of the first slot, on which synchronization signal block #1 410 is transmitted, the third to sixth symbols of the second slot, on which synchronization signal block #2 411 is transmitted, and the seventh to tenth symbols of the second slot, on which synchronization signal block #3 412 is transmitted. Which beam is to be used on OFDM symbols to which no synchronization signal block is mapped may be freely determined under a determination of a base station.

In case #3 403 of the subcarrier spacing of 30 kHz 440, a maximum of two synchronization signal blocks may be transmitted within a time interval of 0.5 ms (406) (or this corresponds to one slot length in a case where one slot is configured by 14 OFDM symbols), and accordingly, a maximum of four synchronization signal blocks may be transmitted within a time interval of 1 ms (or this corresponds to two-slot length in a case where one slot is configured by 14 OFDM symbols) In one example of FIG. 4, synchronization signal block #0 413, synchronization signal block #1 414, synchronization signal block #2 415, and synchronization signal block #3 416 are illustrated to be transmitted in 1 ms (i.e., two slots). Synchronization signal block #0 413 and synchronization signal block #1 414 may be mapped from the third OFDM symbol and the ninth OFDM symbol of the first slot, respectively, and synchronization signal block #2 415 and synchronization signal block #3 416 may be mapped from the third OFDM symbol and the ninth OFDM symbol of the second slot, respectively.

Different analog beams may be used for synchronization signal block #0 413, synchronization signal block #1 414, synchronization signal block #2 415, and synchronization signal block #3 416, respectively. As described above, the same analog beam may be used on four OFDM symbols on which each synchronization signal block is transmitted, and which beam is to be used in OFDM symbols to which no synchronization signal block is mapped may be freely determined under a determination of a base station.

Figure 5:
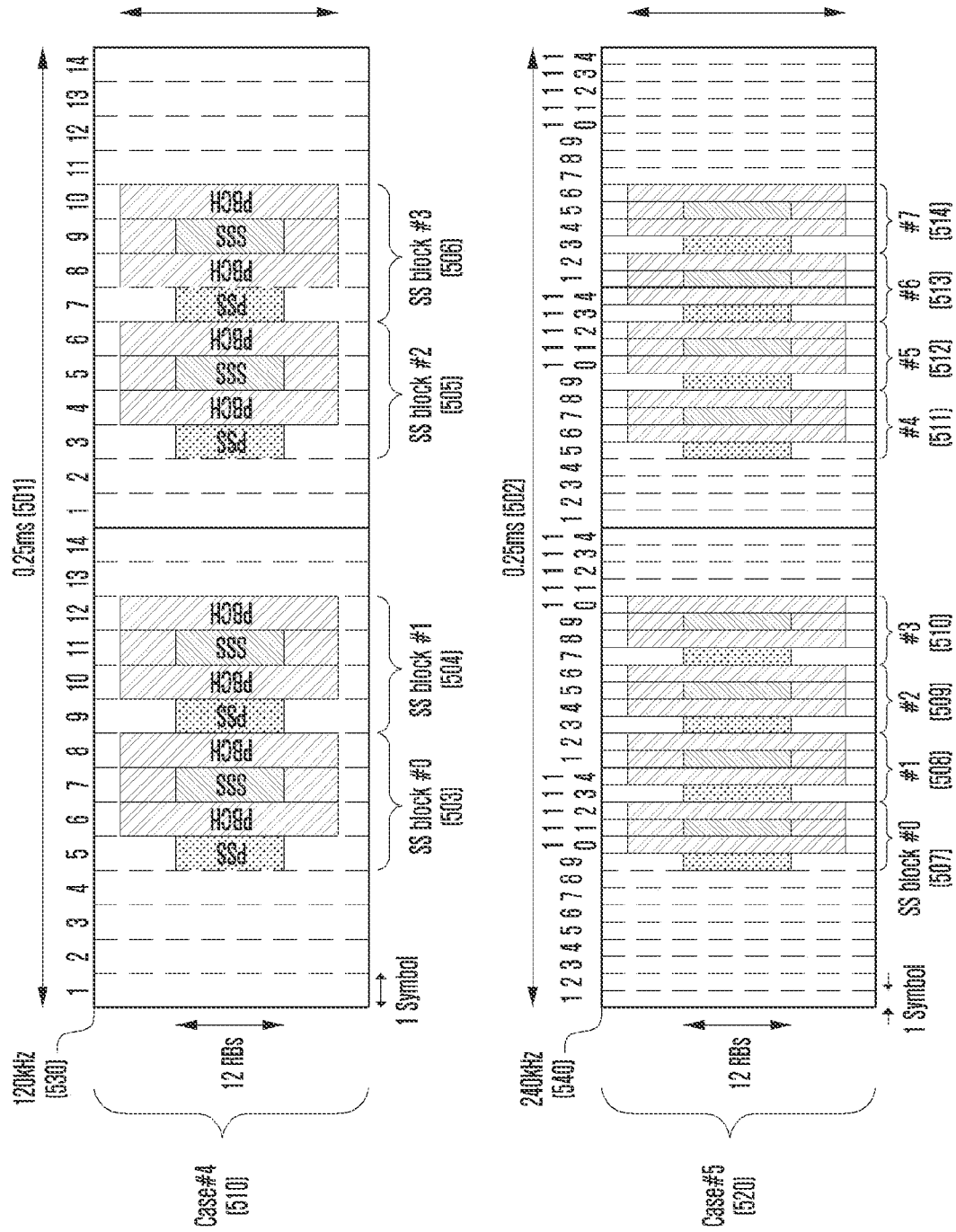
FIG. 5 is a diagram illustrating cases of transmission of a synchronization signal block in a frequency band of 6 GHz or higher considered in a 5G communication system.

FIG. 5 is a diagram illustrating cases of transmission of a synchronization signal block in a frequency band of 6 GHz or higher considered in a 5G communication system.

In a 5G communication system, in a frequency band of 6 GHz or higher, a subcarrier spacing of 120 kHz 530 and a subcarrier spacing of 240 kHz 540 may be used in transmission of a synchronization signal block.

In case #4 510 of the subcarrier spacing of 120 kHz 530, a maximum of four synchronization signal blocks may be transmitted within a time interval of 0.25 ms (501) (or this corresponds to two-slot length in a case where one slot is configured by 14 OFDM symbols). In one example of FIG. 5, a case where synchronization signal block #0 503, synchronization signal block #1 504, synchronization signal block #2 505, and synchronization signal block #3 506 are transmitted in 0.25 ms (i.e., two slots) is illustrated. Synchronization signal block #0 503 and synchronization signal block #1 504 may be mapped from the third OFDM symbol and the ninth OFDM symbol of the first slot, respectively, and synchronization signal block #2 505 and synchronization signal block #5 506 may be mapped from the third OFDM symbol and the seventh OFDM symbol of the second slot, respectively.

As described above, different analog beams may be used for synchronization signal block #0 503, synchronization signal block #1 504, synchronization signal block #2 505, and synchronization signal block #3 506, respectively. The same analog beam may be used on four OFDM symbols on which each synchronization signal block is transmitted, and which beam is to be used in OFDM symbols to which no synchronization signal block is mapped may be freely determined under a determination of a base station.

In case #5 520 of the subcarrier spacing of 240 kHz 540, a maximum of eight synchronization signal blocks may be transmitted within a time interval of 0.25 ms (502) (or this corresponds to four-slot length in a case where one slot is configured by 14 OFDM symbols). In one example of FIG. 5, a case where synchronization signal block #0 507, synchronization signal block #1 508, synchronization signal block #2 509, synchronization signal block #3 510, synchronization signal block #4 511, synchronization signal block #5 512, synchronization signal block #6 513, and synchronization signal block #7 514 are transmitted in 0.25 ms (i.e., four slots) is illustrated. Synchronization signal block #0 507 and synchronization signal block #1 508 may be mapped from the ninth OFDM symbol and the thirteenth OFDM symbol of the first slot, respectively, synchronization signal block #2 509 and synchronization signal block #3 510 may be mapped from the third OFDM symbol and the seventh OFDM symbol of the second slot, respectively, synchronization signal block #4 511, synchronization signal block #5 512, and synchronization signal block #6 513 may be mapped from the fifth OFDM symbol, the ninth OFDM symbol, and the thirteenth OFDM symbol of the third slot, respectively, and synchronization signal block #7 514 may be mapped from the third OFDM symbol of the fourth slot.

As described above, different analog beams may be used for synchronization signal block #0 507, synchronization signal block #1 508, synchronization signal block #2 509, synchronization signal block #3 510, synchronization signal block #4 511, synchronization signal block #5 512, synchronization signal block #6 513, and synchronization signal block #7 514, respectively. The same analog beam may be used on four OFDM symbols on which each synchronization signal block is transmitted, and which beam is to be used in OFDM symbols to which no synchronization signal block is mapped may be freely determined under a determination of a base station.

Figure 6:
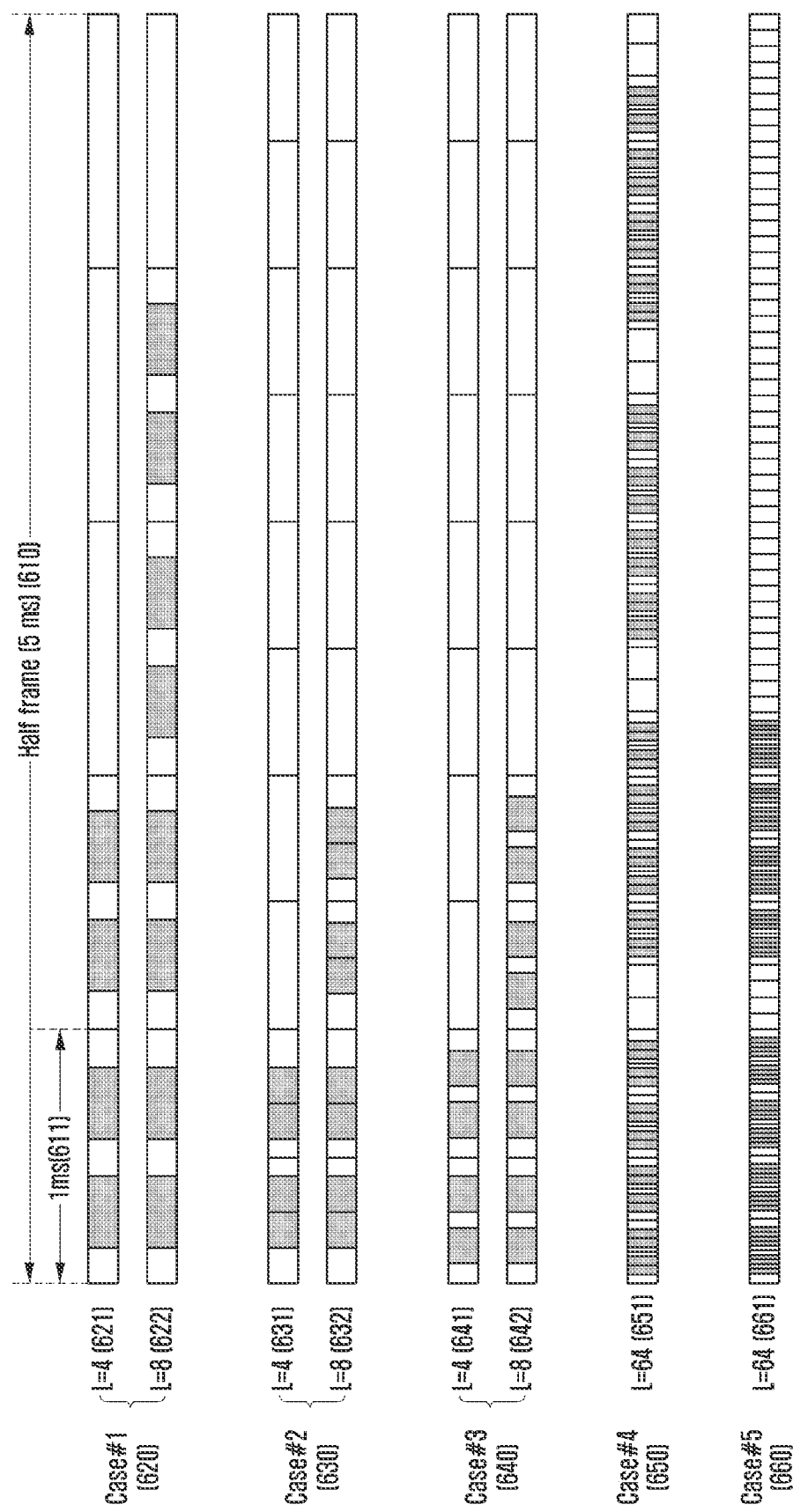
FIG. 6 is a diagram illustrating cases of transmission of a synchronization signal block according to a subcarrier spacing within a time interval of 5 ms.

FIG. 6 is a diagram illustrating cases of transmission of a synchronization signal block according to a subcarrier spacing within a time interval of 5 ms. In a 5G communication system, a synchronization signal block is periodically transmitted in a unit of 5 ms 610 (this corresponds to five subframes or a half frame).

In a frequency band of 3 GHz or lower, a maximum of four synchronization signal blocks may be transmitted in a time interval of 5 ms 610. In a frequency band of 3 GHz to 6 GHz, a maximum of eight synchronization signal blocks may be transmitted. In a frequency band of 6 GHz or higher, a maximum of 64 synchronization signal blocks may be transmitted. As described above, subcarrier spacings of 15 kHz and 30 kHz may be used at a frequency of 6 GHz or lower.

In one example of FIG. 6, case #1 401 of the subcarrier spacing of 15 kHz configured by one slot in FIG. 4 may be mapped to the first slot and the second slot in a frequency band of 3 GHz or lower, and thus a maximum of four synchronization signal blocks 621 may be transmitted. The case may be mapped to the first, second, third, and fourth slots in a frequency band of 3 GHz to 6 GHz, and thus a maximum of eight synchronization signal blocks 622 may be transmitted. Case #2 402 or case #3 403 of the subcarrier spacing of 30 kHz configured by two slots in FIG. 4 may be mapped from the first slot in a frequency band of 3 GHz or lower, and thus a maximum of four synchronization signal blocks 631 or 641 may be transmitted. The case may be mapped from the first and third slots in a frequency band of 3 GHz to 6 GHz, and thus a maximum of eight synchronization signal blocks 632 or 642 may be transmitted.

The subcarrier spacings of 120 kHz and 240 kHz may be used at a frequency of 6 GHz or higher. In one example of FIG. 6, case #4 510 of the subcarrier spacing of 120 kHz configured by two slots in FIG. 5 may be mapped from the first, third, fifth, seventh, eleventh, thirteenth, fifteenth, seventeenth, twenty-first, twenty-third, twenty-fifth, twenty-seventh, thirty-first, thirty-third, thirty-fifth, and thirty-seventh slots in a frequency band of 6 GHz or higher, and thus a maximum of 64 synchronization signal blocks 651 may be transmitted. In one example of FIG. 6, case #5 520 of the subcarrier spacing of 240 kHz configured by four slots in FIG. 5 may be mapped from the first, fifth, ninth, thirteenth, twenty-first, twenty-fifth, twenty-ninth, and thirty-third slots in a frequency band of 6 GHz or higher, and thus a maximum of 64 synchronization signal blocks 661 may be transmitted.

In a conventional LTE communication system, a LTE-MTC (machine-type communication) technology is developed in order to support an application service, such as the Internet of things (IoT). LTE-MTC is an IoT-dedicated access technology considering, as key requirements, a low-power design, low-cost equipment supply, a low construction cost, a stable coverage, large-scale terminal access implementation, etc. The LTE-MTC technology may provide a reduced data rate and transmission bandwidth compared to an LTE service, and may ensure a long battery life of a terminal, based on a low-power design through introduction of a power saving mode, etc. Furthermore, due to a largely reduced data rate and transmission bandwidth, the complexity of a communication modem is significantly reduced, and thus it is possible to implement a low-cost terminal. Moreover, a single antenna technology rather than a multiple antenna (MIMO) technology can be applied, so that power consumption can be minimized. In addition, a conventional LTE network can be utilized with no change, and thus a conventional LTE service and a LTE-MTC service can be simultaneously supported without additional investment.

In order not to affect a terminal receiving a conventional LTE service supported, additional information is included in a remaining bit of an MIB included in a PBCH for the conventional LTE service so as to indicate that a cell having transmitted the PBCH also supports an LTE-MTC service, and additionally, a resource position, at which a system information block (a system information block type 1-bandwidth reduced, an SIB1-BR) for the LTE-MTC service is transmitted, is indirectly indicated. Therefore, a terminal or nodes receiving an LTE-MTC service supported may determine whether a cell found through a cell search is a cell supporting an LTE-MTC service, and if the cell is a cell also supporting an LTE-MTC service, the terminal or nodes may obtain the position of a resource on which a corresponding system information block can be received. Furthermore, a terminal receiving a conventional LTE service supported may receive an LTE service without a new operation or an additional operation with respect to an existing operation.

Figure 7:
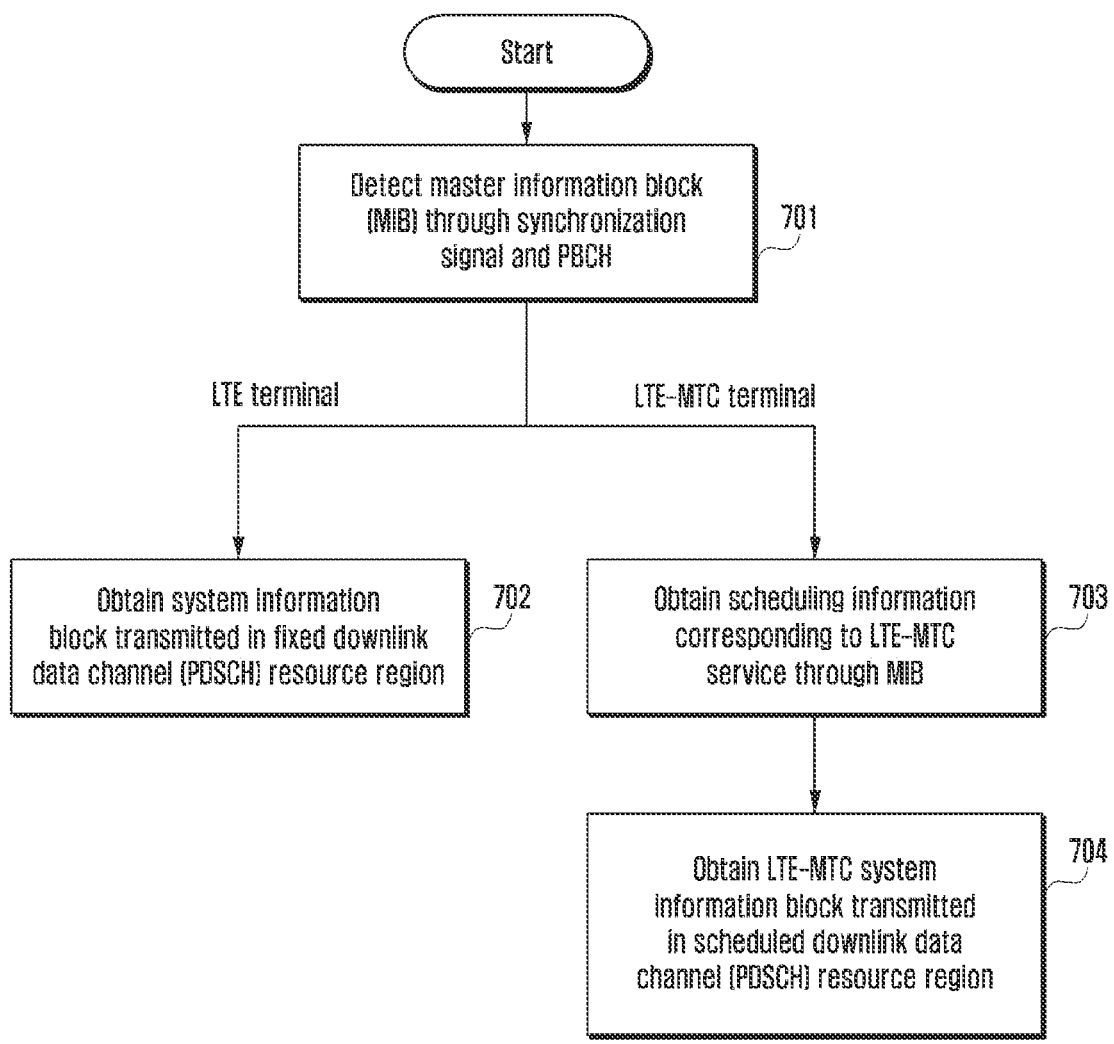
FIG. 7 is a diagram illustrating a procedure in which system information of a conventional LTE service and an LTE-MTC service is transmitted or received.

FIG. 7 is a diagram illustrating a procedure in which system information of a conventional LTE service and an LTE-MTC service is transmitted or received. Referring to FIG. 7, in a conventional LTE service, a base station periodically transmits a synchronization signal and a PBCH to multiple terminals in a system, and a terminal obtains time and frequency synchronization through the synchronization signal, and receives an MIB, which is essential system information, through the PBCH (operation 701). Operation 701 is performed by both an LTE terminal and an LTE-MTC terminal. Thereafter, the LTE terminal receives various pieces of system information, which are called a system information block (SIB), in a fixed resource region (or a PDSCH transmission region) requiring reception of a downlink data channel (a physical downlink shared channel, PDSCH) (operation 702).

The LTE-MTC terminal obtains scheduling information (e.g., the number of times of repetition, and a transport block size (TBS)) corresponding to an additional LTE-MTC service, which is included in the MIB. The LTE-MTC terminal may determine a resource position for reception, based on the scheduling information, and receives a PDSCH to receive various pieces of system information, which are called a system information block and correspond to an LTE-MTC service (operation 704).

Also in a 5G communication system, an mMTC service has been considered in order to support an application service, such as the Internet of Things (IoT). The mMTC service requires the support of massive terminal connection in a cell, the improvement of terminal coverage, improved battery lifetime, terminal cost reduction, etc. in order to efficiently provide the Internet of Things. Particularly, a main characteristic is to reduce a minimum transmission bandwidth required for a terminal supporting the mMTC service in order to reduce a cost of the terminal. In order to reduce additional investment, an existing 5G communication service and a service for mMTC are required to be simultaneously supported in one 5G cell. That is, it is necessary to simultaneously support terminals having an existing transmission bandwidth and terminals having a relatively small transmission bandwidth in one 5G cell, and a terminal receiving an existing 5G communication service supported is required to receive a 5G communication service without an additional operation or a new operation with respect to an existing operation.

Figure 8:
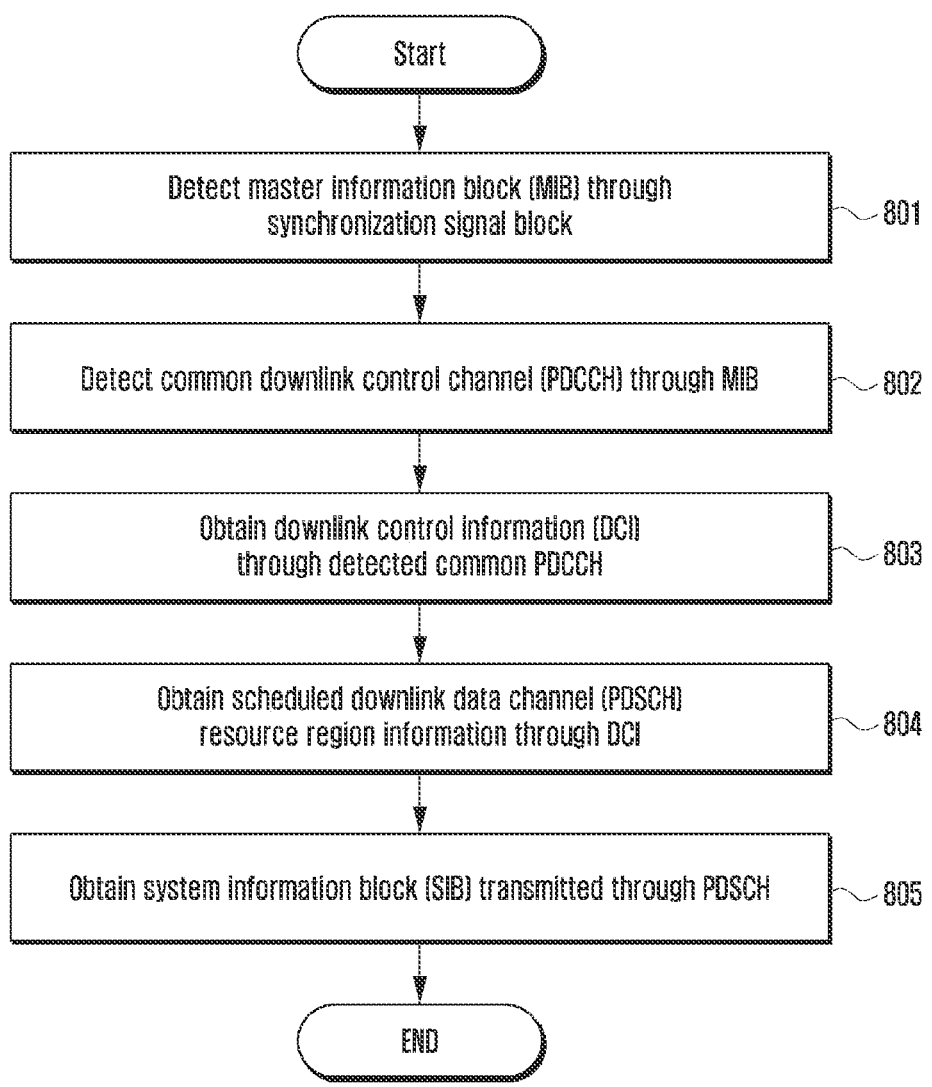
FIG. 8 is a diagram illustrating a procedure in which system information of a 5G mobile communication service is transmitted or received.

FIG. 8 is a diagram illustrating a procedure in which system information of a 5G mobile communication service is transmitted or received. Referring to FIG. 8, a base station periodically transmits a synchronization signal block including a synchronization signal and a PBCH to multiple terminals in a system, and a terminal obtains time and frequency synchronization through the synchronization signal, and receives an MIB, which is essential system information, through the PBCH (operation 801). The terminal monitors or searches for a common downlink control channel (a common physical downlink control channel, a common PDCCH) in a common downlink control channel region (hereinafter, a CORESET or a search space), based on time region and frequency region information indicated through the MIB (operation 802). In a case where the terminal has detected a common PDCCH, the terminal obtains downlink control information (DCI) transmitted from the base station through the detected common PDCCH (operation 803). The terminal may obtain scheduling information of a downlink data channel or an uplink data channel through the received downlink control information (DCI). In other words, the DC may include information relating to a resource region (or a PDSCH transmission region) in which the terminal is required to receive a PDSCH transmitted from the base station, or information relating to a resource region allocated by the base station to the terminal to transmit an uplink data channel (a physical uplink shared channel, a PUSCH). The DCI obtained in operation 803 includes PDSCH transmission region information relating to a PDSCH transmission region in which the base station transmits an SIB, and the terminal obtains the PDSCH transmission region information from the DCI (operation 804). Various pieces of system information, which are called a system information block (SIB), may be transmitted through the scheduled PDSCH, and the terminal obtains the SIB (operation 805).

In a conventional LTE system, whether there is a system information block (SIB1-BR) corresponding to an LTE-MTC service, and scheduling information of a PDSCH including an SIB1-BR are indicated using five bits among remaining 10 bits (spare bits) in an MIB. In addition, in a case of a conventional LTE system, a resource scheduled for a PDCSH including an SIB1 is fixed, and thus a terminal can receive an SIB1 even without obtaining downlink control information, and a resource scheduled for an SIB1-BR corresponding to an LTE-MTC service may be also configured to avoid a fixedly scheduled SIB1. Meanwhile, in a case of a 5G system, a PDSCH including an SIB1 is scheduled based on downlink control information (DCI), scheduling is very flexible accordingly, and thus scheduling of a system information block corresponding to an mMTC service is also required to be flexibly changeable.

Therefore, the disclosure provides a method for determining whether there is system information block information corresponding to an mMTC service, in order for a base station to simultaneously support an existing 5G mobile communication service and the mMTC service. Furthermore, the disclosure provides a method for, when there is a system information block corresponding to an mMTC service, configuring a PDSCH resource of the system information block corresponding thereto.

Hereinafter, the disclosure proposes a method and an apparatus for transmitting an SIB (this may include an MIB and an SIB. It may be understood that an SIB for supporting mMTC described below includes an mMTC MIB and an mMTC SIB) for supporting an mMTC service. However, the subject matter of the disclosure is not limited to mMTC, and the disclosure may be applied to a service for providing an IoT service or a service requiring the support of massive terminal access in a cell, the improvement of terminal coverage, improved battery lifetime, terminal cost reduction, etc.

Furthermore, the disclosure may be applied to a method and an apparatus for transmitting an SIB for a different service (e.g., URLLC) which can be provided in a 5G system.

First Embodiment

The first embodiment of the disclosure provides a method for indicating whether there is a system information block corresponding to an mMTC service, in order for a base station to simultaneously support an existing 5G mobile communication service and the mMTC service. Through a method for indicating whether there is a system information block corresponding to an mMTC service, without an additional operation or a new operation with respect to an existing operation of receiving system information by an existing 5G terminal, described in this embodiment, an existing 5G cell can support an existing 5G communication service and an mMTC service.

Specifically, it is assumed that an operation of receiving system information by an existing 5G terminal is changed in order to indicate whether there is a system information block corresponding to an mMTC service. It is difficult to change all operations of existing 5G terminals. Therefore, a cell supporting an mMTC service can simultaneously support a changed 5G terminal and an mMTC service, but it is unable to use previously installed 5G base stations to provide the mMTC service, and thus additional investment is inevitable. Therefore, a method for indicating whether there is a system information block corresponding to an mMTC service, without changing an operation of an existing 5G terminal, in order for a base station to simultaneously support an existing 5G mobile communication service and the mMTC service is proposed.

The following methods may be considered as a method indicating whether there is a system information block corresponding to an mMTC service.

[Method 1]

A base station may explicitly indicate, to a terminal and by using only additional one bit, whether there is a system information block (hereinafter, an mMTC SIB) corresponding to an mMTC service. Pieces of information for scheduling a system information block may be scheduled on a fixed resource as in a conventional LTE system, may be linked to a resource of a system information block for existing 5G communication, or may be configured through another additional bit for scheduling. A detailed method thereof follows a description related to the second embodiment. The base station explicitly indicates whether there is a system information block corresponding to an mMTC service, whereby, when a terminal supporting the mMTC service detects a particular SSB, and then determines that there is no system information block for the mMTC service, the terminal may search for another SSB to obtain a system information block corresponding to the mMTC service.

The following methods may be considered as a method for indicating additional one bit to the terminal by the base station.

[Method 1-1]

A base station may indicate whether there is a system information block corresponding to an mMTC service, by using one spare bit existing in an MIB for an existing 5G communication service. Table 2 may be used as a reference for a detailed description thereof. This method is the simplest method by which whether there is a system information block corresponding to an mMTC service can be indicated without a new operation or an additional operation with respect to an existing operation of receiving system information by an existing 5G terminal. However, there is only one bit as a spare bit. Therefore, if the bit is used for the mMTC service, it may be difficult to expand the content of an MIB any more for a different service or technology. For example, if one spare bit of an MIB is configured to be 1, an mMTC terminal may recognize that a base station transmits a system information block corresponding to an mMTC service corresponding to a detected SSB, and may obtain an mMTC SIB. If one spare bit of an MIB is configured to be 0, the mMTC terminal is required to detect another SSB to obtain a system information block.

[Method 1-2]

Figure 9:
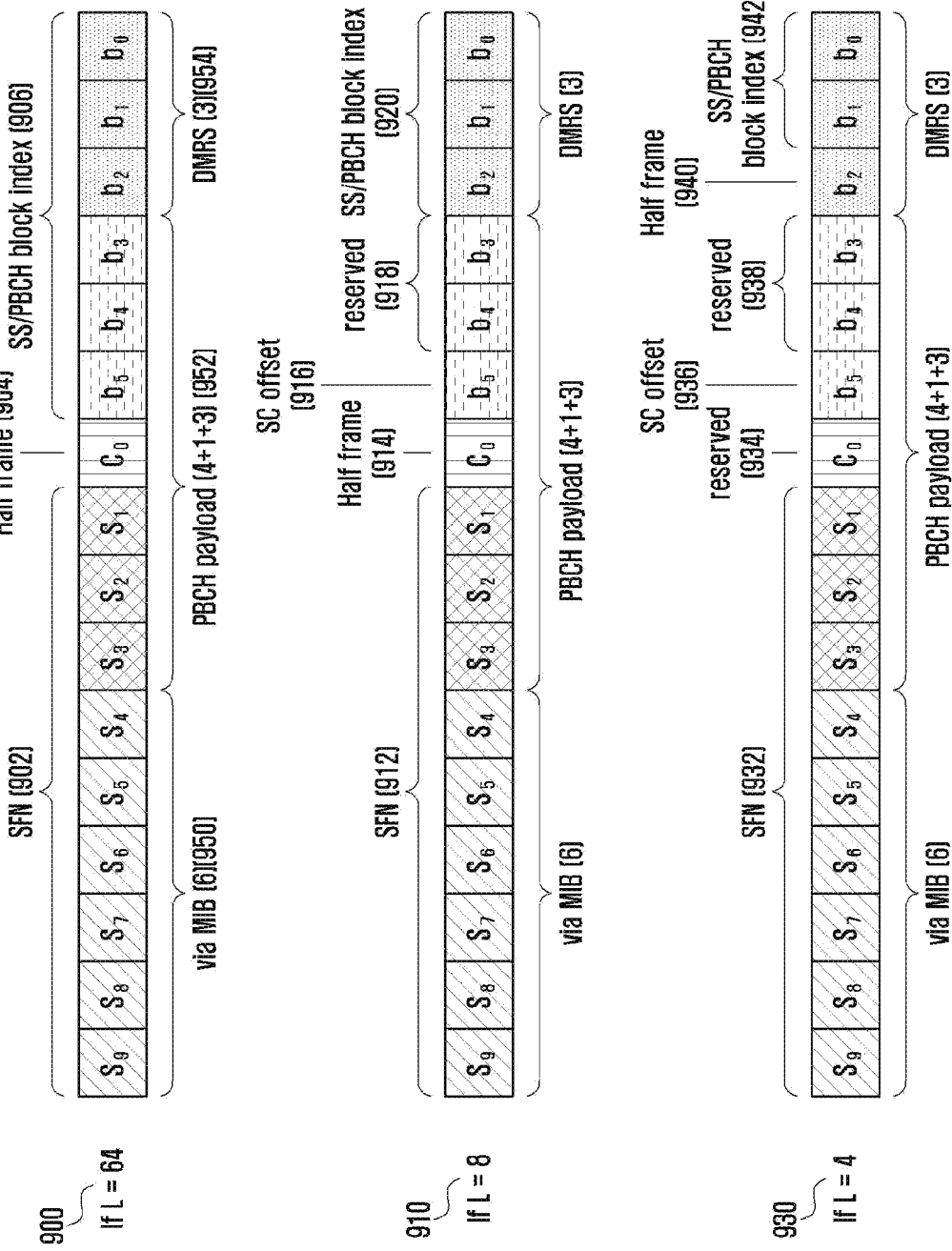
FIG. 9 is a diagram illustrating an example of a method of indicating whether there is an mMTC SIB, by using a PBCH payload.

A base station may indicate whether there is a system information block corresponding to an mMTC service, by using one bit among reserved bits existing in a PBCH payload for an existing 5G communication service. FIG. 9 is a diagram illustrating an example of a method of indicating whether there is an mMTC SIB, by using a PBCH payload. In FIG. 9, information which can be indicated by an MIB, a PBCH payload, and an initialization value of a PBCH DMRS sequence is illustrated. Specifically, six bits 950 for indicating an SFN in an MIB, eight bits 952 included in a PBCH payload, and three bits 954, which is an initial value of a PBCH DMRS sequence (a total of 17 bits) are illustrated.

In FIG. 9, in a case 930 where a maximum number of SSBs is four (i.e., a case where a center frequency is lower than 3 GHz), only two bits 942 are required to indicate an SSB index, and thus three reserved bits 934 and 938 may exist. That is, there are three reserved bits 934 and 938 remaining after excluding, from the total of 17 bits, 10 SFN bits 932, one SC offset bit 936, one half-frame bit 940, and two SSB index bits 942, and one of the reserved bits may be used to indicate whether an mMTC SIB exists.

In a case 910 where a maximum number of SSBs is eight (i.e., a case where a center frequency is 3 GHz (inclusive) to 6 GHz (exclusive)), three bits 920 are required to indicate an SSB index, and thus two reserved bits 918 may exist. That is, there are two reserved bits 918 remaining after excluding, from the total of 17 bits, 10 SFN bits 912, one half-frame bit 914, one SC offset bit 916, and three SSB index bits 920, and one of the reserved bits may be used to indicate whether an mMTC SIB exists. According to this method, similar to method 1-1, whether an mMTC SIB exists can be indicated without a new operation or an additional operation with respect to an existing operation of receiving system information by an existing 5G terminal.

However, in a case 900 where a maximum number of SSBs is 64 (i.e., a case where a center frequency is 6 GHz or higher), 10 SFN bits 902, one half-frame bit 904, six SSB bits 906 among the total of 17 bits are included, and thus there is no reserved bit. Therefore, it is difficult to apply the above method. In this case, a base station may indicate whether an mMTC SIB exists, through a different method such as method 1-1 or method 1-3. Alternatively, since an mMTC terminal is required to reduce a transmission bandwidth as described above, it may be difficult to support, in a frequency band of 6 GHz or higher, an mMTC service due to a large SCS corresponding to the frequency band, and thus mMTC may be supported only in a frequency lower than 6 GHz.

The order and size of each information illustrated in FIG. 9 merely correspond to an example, and the order and size of reserved bits and other information may be changeably applied.

[Method 1-3]

In generating a PBCH DMRS sequence for an existing 5G communication service, three-bit information is indicated according to an initialization value. This may be expressed by Equation 2 below.

$$c_{init}=2^{11}(\bar{i}_{SSB}+1)(\lfloor N_{ID}^{cell}/4 \rfloor+1)+2^{6}(\bar{i}_{SSB}+1)+(N_{ID}^{cell} \mod 4)$$
$$\bar{i}_{SSB}=i_{SSB}+4n_{hf}(L=4) \text{ or } \bar{i}_{SSB}=i_{SSB}(L=8 \text{ or } 64)$$
[Equation 2]

$i_{SSB}$ is two least significant bits (LSBs) of a synchronization signal block index in a frequency band of 3 GHz or lower, is three LSBs of a synchronization signal block index in a frequency band of 3 GHz or higher, and is used to indicate a synchronization signal block index. $n_{hf}$ is one bit indicating a half frame timing. $N^{cell}_{ID}$ indicates a cell ID estimated through an SSS and a PSS.

Additional bit information may be included in an initialization value used in generating a PBCH DMRS sequence, as well as the existing three bits. An initialization value may include 31 bits, but a currently used initialization value expresses information by using only 17 bits (that is, only 17 bits can be changed). Therefore, the 15 remaining bits may be used to indicate additional information without changing three bits indicating current information. Therefore, a base station may indicate whether there is a system information block corresponding to an mMTC service, by additional one bit of an initialization value used in a PBCH DMRS sequence for an existing 5G communication service.

For example, one $i_{SIB1\text{-}lite}$ bit indicating whether there is a system information block corresponding to an mMTC service may be included in an $i_{SSB}$ or $c_{init}$ value. A detailed method thereof may be expressed as in Equation 3 or Equation 4 below.

$$c_{init}=2^{11}(\bar{i}_{SSB}+1)(\lfloor N_{ID}^{cell}/4 \rfloor+1)+2^{6}(\bar{i}_{SSB}+1)+(N_{ID}^{cell} \mod 4)$$

$$\bar{i}_{SSB}=i_{SSB}+4n_{hf}+8i_{SIB1\text{-}lite}(L=4) \text{ or }$$
$$\bar{i}_{SSB}=i_{SSB}+8i_{SIB1\text{-}lite}(L=8 \text{ or } 64)$$
[Equation 3]

$$c_{init}=2^{17}(i_{SIB1\text{-}lite}+1)+2^{11}(\bar{i}_{SSB}+1)(\lfloor N_{ID}^{cell}/4 \rfloor+1)+2^{6}(\bar{i}_{SSB}+1)+(N_{ID}^{cell} \mod 4)$$

$$\bar{i}_{SSB}=i_{SSB}+4n_{hf}(L=4) \text{ or } \bar{i}_{SSB}=i_{SSB}(L=8 \text{ or } 64)$$
[Equation 4]

The expressed equations merely correspond to examples, and may be applied through partial modification without departing too far from the scope of the disclosure according to the determination of a person skilled in the art.

[Method 2]

A base station may explicitly indicate, to a terminal, whether there is a system information block corresponding to an mMTC service, by using additional multiple bits, and may also directly or indirectly indicate scheduling information of a PDSCH through which a system information block corresponding to the mMTC service is transmitted. Pieces of information for scheduling a system information block indicated by the additional multiple bits may be scheduled on a fixed resource as in a conventional LTE system, may be linked to a resource of a system information block for existing 5G communication, or may be configured through another additional bit for scheduling. A detailed method thereof follows a description related to the second embodiment. The base station explicitly indicates whether there is a system information block corresponding to an mMTC service, whereby, when a terminal supporting the mMTC service detects a particular SSB, and then determines that there is no system information block for the mMTC service, the terminal may search for another SSB to obtain a system information block corresponding to the mMTC service.

The following method may be considered as a method for indicating additional multiple bit to the terminal by the base station.

[Method 2-1]

Similarly to method 1-3 described above, a base station may, when generating a PBCH DMRS sequence, an initialization value including additional multi-bit information as well as the existing three bits. Through the additional multi-bit information, the base station may not only explicitly indicate whether there is a system information block corresponding to an mMTC service, but also directly or indirectly indicate scheduling information of a PDSCH through which a system information block corresponding to the mMTC service is transmitted.

For example, $i_{SIB1-lite}$ (multiple bits) indicating whether there is a system information block corresponding to an mMTC service, and indicating scheduling information of a PDSCH through which a system information block corresponding to the mMTC service is transmitted may be included in a $c_{init}$ value. Specifically, the $c_{init}$ value may be expressed by Equation 5 below.

$$c_{init}=2^{17}(i_{SIB1-lite}+1)+2^{11}(\bar{i}_{SSB}+1)(\lfloor N_{ID}^{cell}/4 \rfloor+1)+2^{6}(\bar{i}_{SSB}+1)+(N_{ID}^{cell} \bmod 4)$$

$$\bar{i}_{SSB}=i_{SSB}+4n_{hf}(L=4) \text{ or } \bar{i}_{SSB}=i_{SSB}(L=8 \text{ or } 64) \quad \text{[Equation 5]}$$

The expressed equation merely corresponds to examples, and may be applied through partial modification without departing too far from the scope of the disclosure according to the determination of a person skilled in the art.

[Method 3]

As a method for indicating whether there is a system information block corresponding to an mMTC service, provided is a method for indicating, by a base station, whether there is a system information block corresponding to an mMTC service, through a signal including information associated with the mMTC service on a time and frequency resource associated with an existing SSB. Specifically, a base station supporting an mMTC service transmits an existing SSB, and additionally transmits a signal including information associated with the mMTC service on a resource positioned at a relevant time and frequency.

Figure 10:
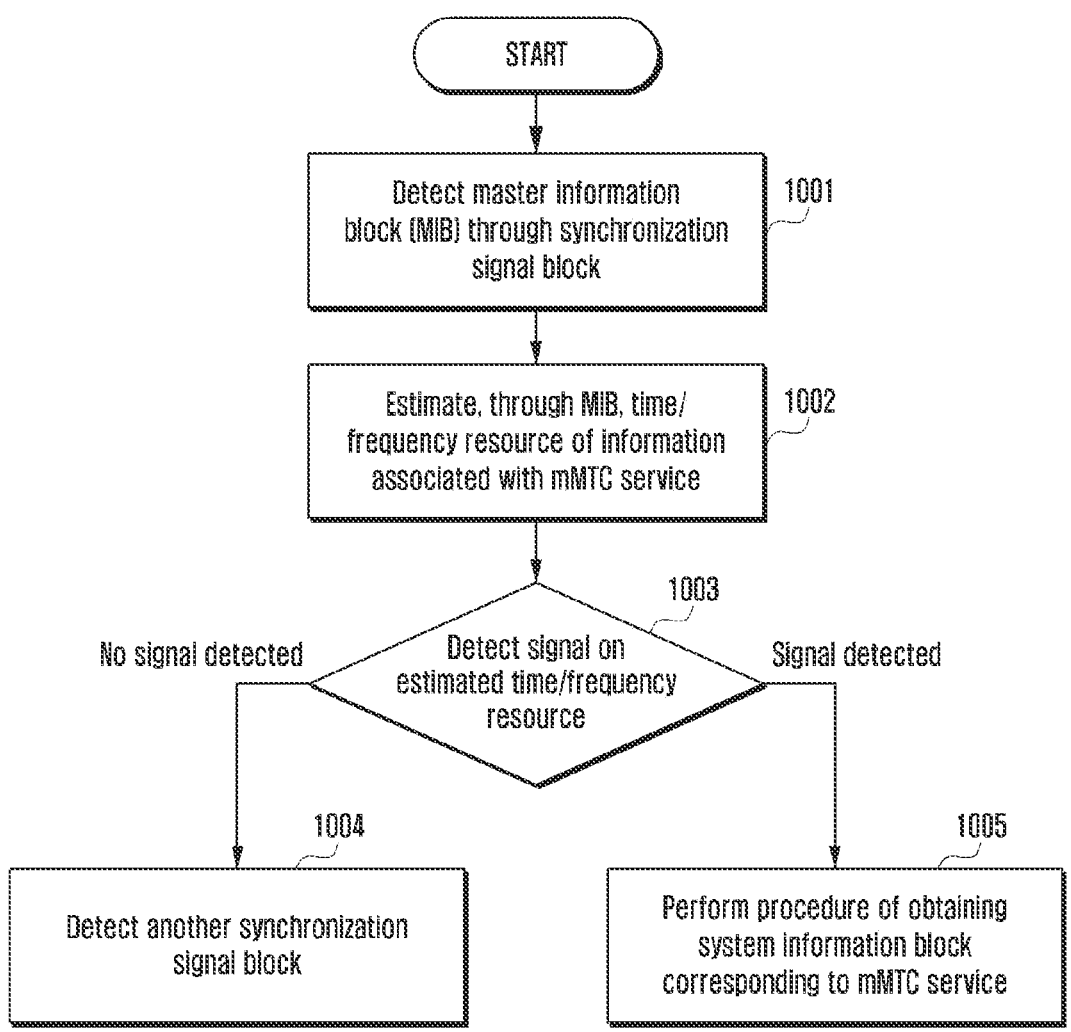
FIG. 10 is a diagram illustrating a procedure of determining, by a terminal, whether there is a system information block corresponding to an mMTC service.

FIG. 10 is a diagram illustrating a procedure of determining, by a terminal, whether there is a system information block corresponding to an mMTC service.

Referring to FIG. 10, similarly to an existing 5G communication service, a base station periodically transmits an existing SSB including a synchronization signal and a PBCH to multiple terminals in a system, and a terminal obtains time and frequency synchronization through the synchronization signal, and receives an MIB, which is essential system information, through the PBCH (operation 1001). An mMTC terminal estimates, through the MIB, a resource region of a signal including information associated with an mMTC service (operation 1002). The mMTC terminal may estimate a time and/or frequency resource region of a signal including information associated with the mMTC service, based on at least one information among an SFN, an SSB index, a half frame timing, an SCS, an SSB subcarrier offset included in the MIB. The mMTC terminal attempts to detect an mMTC service signal on the estimated time and/or frequency resource (operation 1003). In a case where the mMTC terminal has detected a signal on the resource region, the mMTC terminal determines that there is a system information block corresponding to the mMTC service, and performs a procedure of obtaining the system information block (operation 1005). If the mMTC terminal has failed to detect a signal on the resource region, the mMTC terminal repeats the same procedure, based on another synchronization signal block, so as to determine the existence of a system information block corresponding to the mMTC service (operation 1004).

Figure 11A:
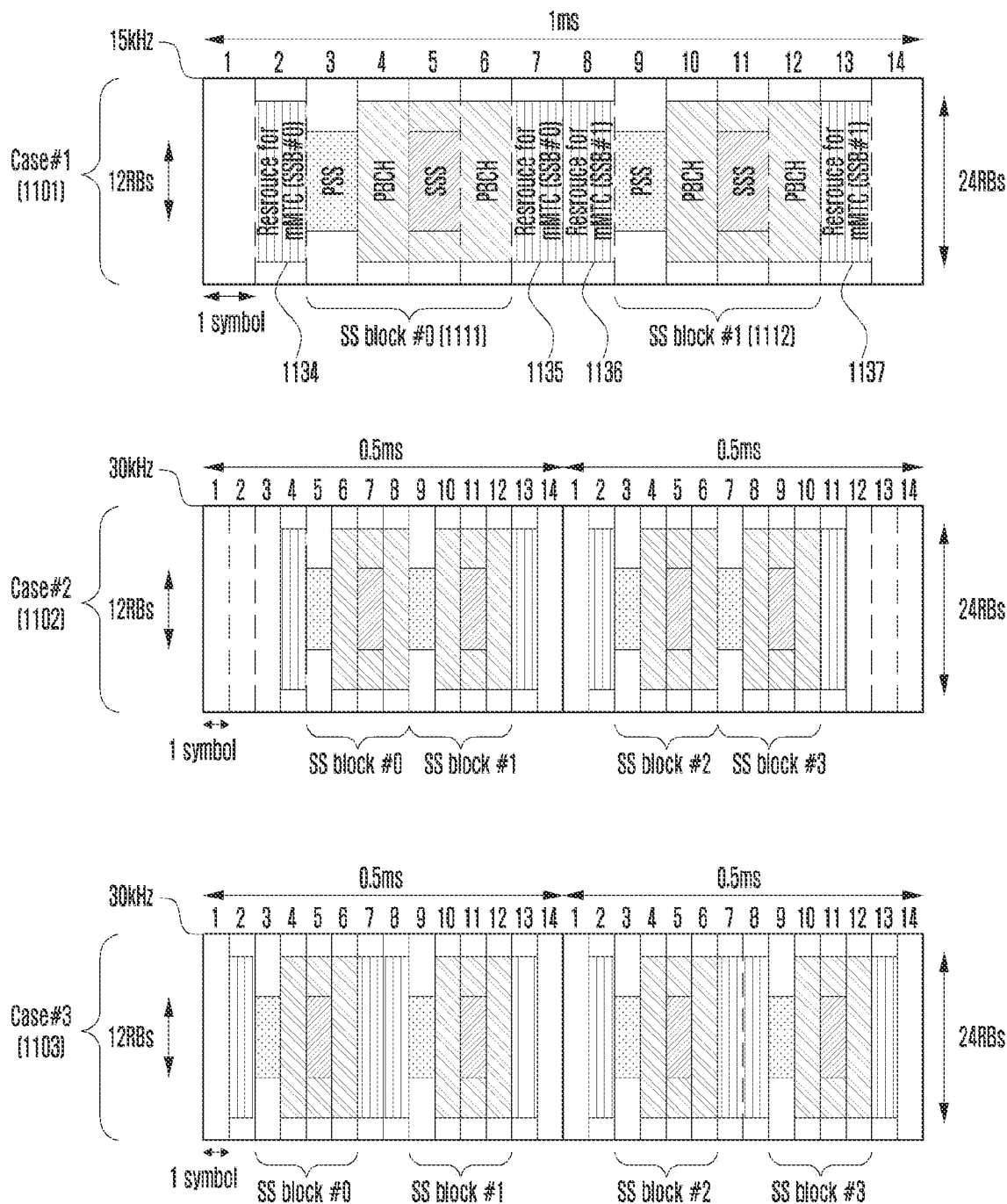
FIG. 11A is a diagram illustrating an example of a time/frequency resource region of a signal including information associated with an mMTC service, which is associated with a synchronization signal block.
Figure 11B:
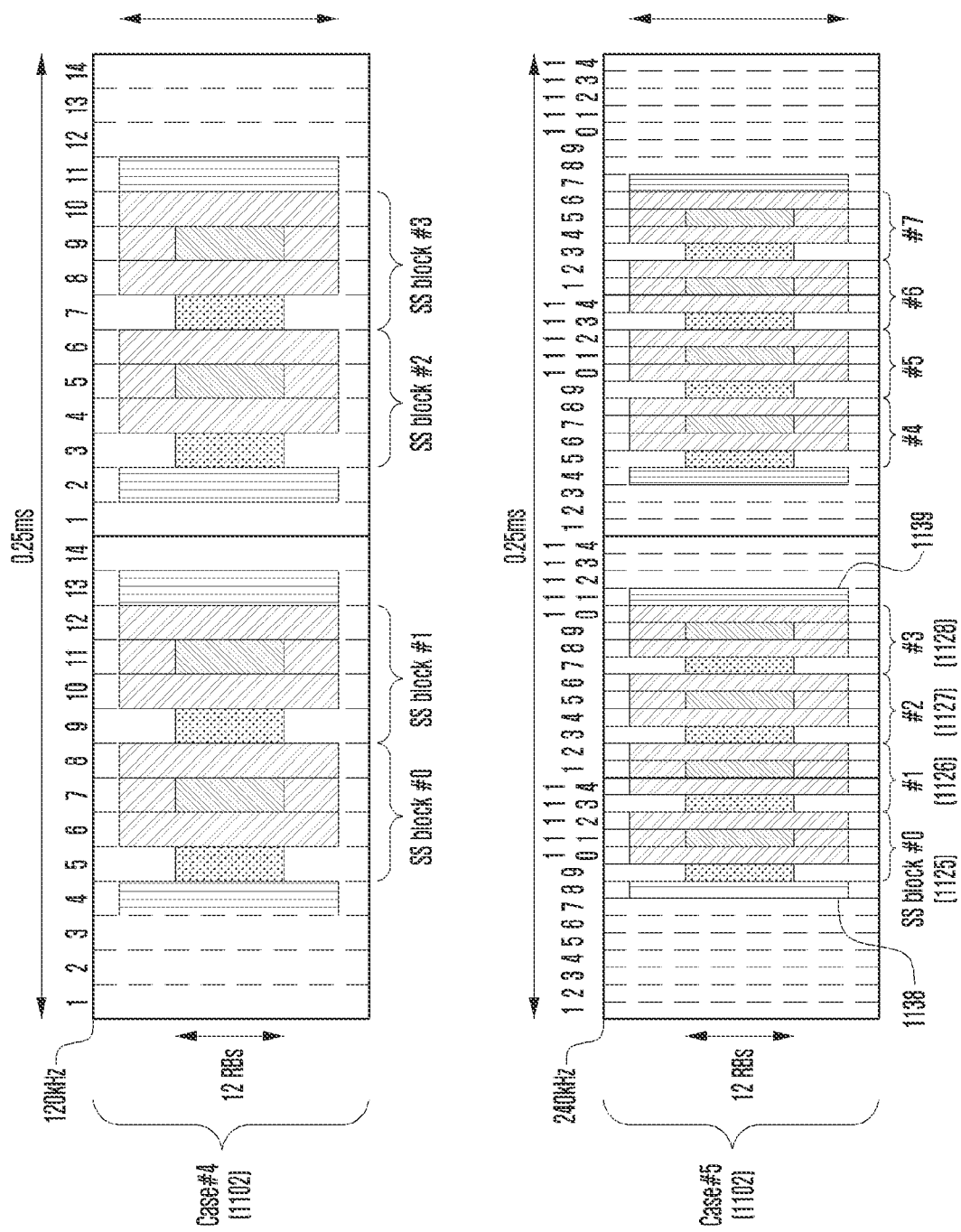
FIG. 11B is a diagram illustrating another example of a time/frequency resource region of a signal including information associated with an mMTC service, which is associated with a synchronization signal block.

FIG. 11A is a diagram illustrating an example of a time and/or frequency resource region of a signal including information associated with an mMTC service, which is associated with a synchronization signal block. FIG. 11B is a diagram illustrating another example of a time and/or frequency resource region of a signal including information associated with an mMTC service, which is associated with a synchronization signal block.

According to FIG. 11A, synchronization signal block #0 1111 and relevant resources 1134 and 1135 for an mMTC service in case #1 1101 are required to use the same beam. Therefore, in a case where the synchronization signal block 1111 and a relevant resource for an mMTC service are close to each other, beam management can be more efficient. For example, resources for an mMTC service, which are associated with synchronization signal block #1 1112, may be resources 1136 and 1137.

Not all synchronization signal blocks and resources for an mMTC service may be associated with each other. In case #5 1105 illustrated in FIG. 11B, four synchronization signal blocks 1125, 1126, 1127, and 1128 are consecutively transmitted on the time axis, and thus, with respect to the two middle synchronization signal blocks 1126 and 1127, relevant resources for an mMTC service may not be transmitted. In a case where the two middle synchronization signal blocks 1126 and 1127 are detected first, an mMTC terminal detects again the first synchronization signal block 1125 or the fourth first synchronization signal block 1128 among the consecutive synchronization signal blocks, so as to detect resources 1138 and 1139 for an mMTC resource. In addition, even in case #1 1101, case #2 1102, case #3 1103, and case #4 1104 illustrated in FIG. 11A and FIG. 11B, not all synchronization signal blocks with which resources for an mMTC service are associated may exist for resource efficiency.

According to the following method, information indicating whether there is a system information block corresponding to an mMTC service may be transmitted on a resource for an mMTC service, described above.

If there are two resources for an mMTC service, which are associated with one synchronization signal block, a signal may be transmitted on each resource according to different methods described below.

[Method 3-1]

A PBCH for an mMTC service rather than a PBCH included in an existing synchronization signal block may be transmitted on a resource for an mMTC service, described above. Through the PBCH for mMTC, information indicating whether there is a system information block corresponding to an mMTC service, and an additional mMTC service MIB may be provided, or information for obtaining system information may be transmitted. An mMTC terminal obtains and refers to MIB information provided from an existing PBCH, and information for obtaining a system information block of an mMTC service, which is additionally transmitted, may include at least one of the following pieces of information. Furthermore, pieces of information described in the second embodiment may be included in the information for obtaining the mMTC SIB.

CORESET and/or search space information: CORESET and/or search space information for obtaining downlink control information (DCI) which schedules a system information block of an mMTC service Downlink control information (DCI): information for scheduling a system information block of an mMTC service System information block scheduling information for an mMTC service A procedure of obtaining a system information block of an mMTC service, based on the above pieces of information will be described in detail in the second embodiment.

[Method 3-2]

An mMTC service significantly requires coverage enlargement as well as terminal complexity reduction, and thus an existing PBCH may be repeatedly transmitted on a resource for an mMTC service described above. A base station may expand a coverage within which an mMTC terminal can decode a PBCH, by repeatedly transmitting an existing PBCH.

A PBCH is transmitted for a total of three OFDM symbols in one synchronization signal block. Referring to FIG. 11A and FIG. 11B, not all the synchronization signal blocks illustrated in FIGS. 11A and 11B are actually transmitted. Therefore, since there are not enough resources to repeat all the PBCHs, only a PBCH of a part of synchronization signal blocks may be repeated. Furthermore, unlike the description given with referent to FIG. 11, the repeated PBCH may be transmitted in a different slot which is not continuously disposed with respect to a synchronization signal block, is known to both a terminal and a base station, and is fixed (or has a predetermined relationship with a resource on which the synchronization signal block is transmitted).

In a case where a repeated PBCH resource is detected, an mMTC terminal may determine that there is a system information block corresponding to an mMTC service.

That is, an mMTC terminal may determine that there is an mMTC system information block corresponding to a synchronization signal block in which a repeated PBCH exists.

[Method 3-3]

A base station may indicate whether there is a system information block corresponding to an mMTC service, by transmitting a newly designed sequence on a resource for an mMTC service described above, and may also provide additional system information of an mMTC service. Specifically, an mMTC terminal may refer to MIB information provided in an existing PBCH, to detect a sequence on a reference for an mMTC service so as to determine whether there is a system information block corresponding to an mMTC service. In addition, in a case where a sequence is generated, an initialization value configuration method may be designed to include information for obtaining additional system information of an mMTC service. A base station may generate a sequence, based on an initialization value obtained based on information for obtaining an mMTC SIB, and transmit the sequence on a resource for an mMTC service. A sequence used above may be generated as a pseudo-random sequence defined by a gold sequence, for example, which has a sequence length of 31. The generated pseudo-random sequence c(n) may be expressed by Equation 6 below.

$c(n)=(x_1(n+N_C)+x_2(n+N_C)) \mod 2$ $x_1(n+31)=(x_1(n+3)+x_1(n)) \mod 2$ $x_2(n+31)=(x_2(n+3)+x_2(n+2)+x_2(n+1)+x_2(n)) \mod 2$ [Equation 6]

$N_C$ is 1600, and the first m sequence $x_1(n)$ is initialized by $x_1(0)=1$, $x_1(n)=0$, and $n=1, 2, \ldots, 30$. The initialization of the second m sequence is expressed by $c_{init}=\Sigma_{i=0}^{30} x_2(i) \cdot 2^i$. The $c_{init}$ value may be the initialization value described above.

Similar to method 3-1, information for obtaining a system information block of an mMTC service with respect to an initialization value of a sequence may be at least one of the following pieces of information.

CORESET and/or search space information: CORESET and/or search space information for obtaining downlink control information (DCI) which schedules a system information block of an mMTC service Downlink control information (DCI): information for scheduling a system information block of an mMTC service System information block scheduling information for an mMTC service A procedure of obtaining a system information block of an mMTC service, based on the above pieces of information will be described in detail in the second embodiment.

The above methods are not limited to a method for indicating whether there is a system information block corresponding to an mMTC service, and may be applied to indicate whether there is an SIB for a new service rather than mMTC.

Second Embodiment

The second embodiment provides a method for, when there is a system information block corresponding to an mMTC service, indicating a resource on which the system information block is transmitted. Specifically, if whether there is a system information block corresponding to an mMTC service is indicated to an mMTC terminal in the first embodiment, the mMTC terminal is required to know which resource on which the system information block is transmitted, so as to receive the system information block.

Furthermore, as described above, in order for a base station to simultaneously support an existing 5G mobile communication service and an mMTC service without changing an operation of an existing 5G terminal, a resource on which a system information block of the existing service is transmitted, and a resource on which a system information block corresponding to the mMTC service is transmitted are required to be different from each other. In addition, in a case of a conventional LTE system, as described above, scheduling of a PDCSH including a system information block is fixed, and thus a terminal can receive an SIB even without obtaining downlink control information, and a resource on an SIB1-BR corresponding to an LTE-MTC service is transmitted may be also configured to avoid a fixed-resource scheduled SIB1.

However, an SIB for an existing 5G communication service is scheduled based on downlink control information, and thus resources thereof are flexible. Therefore, scheduling of a system information block corresponding to an mMTC service is also required to be flexibly changeable.

The following methods may be considered as a method indicating a resource on which a system information block corresponding to an mMTC service is transmitted.

[Method 1]

An mMTC terminal may detect a common downlink control channel (common PDCCH) corresponding to an mMTC service on a resource configured as a CORESET and a search space through an MIB of an existing 5G system.

Figure 12:
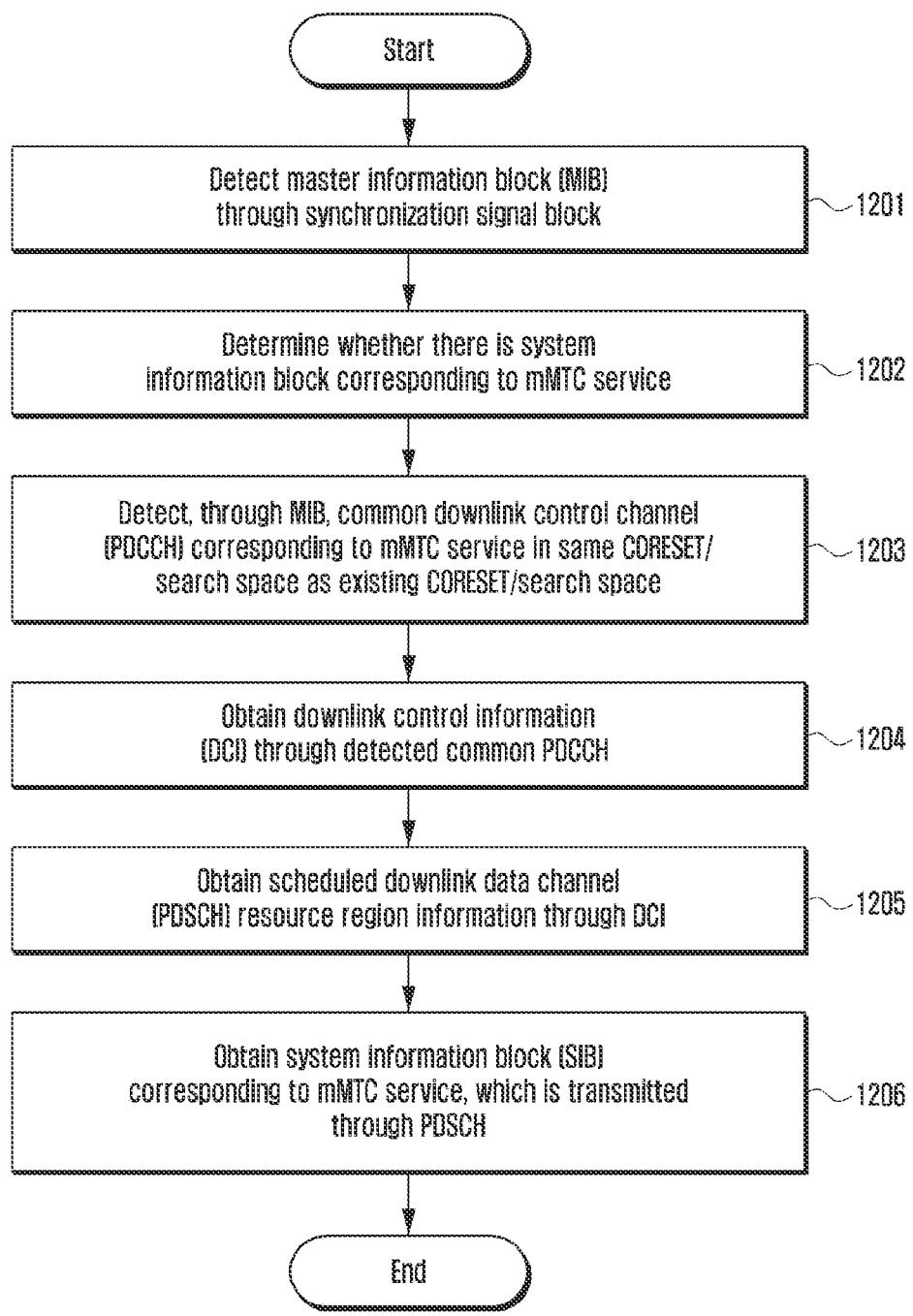
FIG. 12 is a diagram illustrating a procedure of obtaining system information of an mMTC service.

FIG. 12 is a diagram illustrating a procedure of obtaining system information of an mMTC service. According to FIG. 12, a base station periodically transmits a synchronization signal block to multiple terminals in a system, and a terminal obtains time and frequency synchronization through the synchronization signal, and receives an MIB, which is essential system information, through the PBCH (operation 1201).

An mMTC terminal determines whether there is a system information block corresponding to an mMTC service (operation 1202). The determination may follow a method of the first embodiment. If the mMTC terminal determines that there is a system information block corresponding to an mMTC service, the mMTC terminal monitors or searches for a common PDCCH corresponding to an mMTC service in a common downlink control channel region (a CORESET and/or a search space (SS)), based on time and frequency region information which is the same as that configured to receive an SIB for an existing 5G communication service through the MIB (operation 1203).

In a case where the mMTC terminal has detected a common PDCCH corresponding to an mMTC service, the mMTC terminal obtains downlink control information transmitted through the detected common PDCCH (operation 1204). The terminal may obtain scheduling information of a downlink data channel or an uplink data channel through the received downlink control information (DCI). In other words, the DCI may include information relating to a resource region (or a PDSCH transmission region) in which the terminal is required to receive a PDSCH transmitted from the base station, or information relating to a resource region allocated by the base station to the terminal to transmit a PUSCH. The mMTC terminal obtains, through the received DCI, PDSCH resource region information of PDSCH on which an mMTC SIB is transmitted (operation 1205). Various pieces of system information, which are called an SIB corresponding to an mMTC service, may be transmitted through the scheduled downlink data channel, and the mMTC terminal obtains the mMTC SIB (operation 1206).

As described above, an mMTC service is required to be supported without an additional operation or a new operation with respect to an existing operation of receiving system information by an existing 5G terminal. To this end, an mMTC terminal may perform blind decoding of a common downlink control channel corresponding to an mMTC service, based on a new parameter (e.g., a new RNTI for an mMTC service, such as an MTC-RNTI) not overlapping with a parameter (a system information-radio network temporary identifier, an SI-RNTI) used to perform blind decoding of a common downlink control channel corresponding to an existing 5G service. A cyclic redundancy check (CRC) is attached to a DCI payload for mMTC, and the CRC may be scrambled with the new parameter. The mMTC terminal may identify a CRC attached to the DCI by using a new parameter, and if a result of identifying the CRC is true, the mMTC terminal may identify that the DCI is DCI for obtaining an mMTC SIB.

That is, one CORESET and one search space may include both a common downlink control channel for scheduling a system information block of an existing 5G service, and a common downlink control channel for scheduling a system information block of an mMTC service. If an existing 5G terminal and an mMTC terminal are able to receive different DCI, different scheduling of a PDSCH transmitting a system information block may be indicated to the terminals, respectively.

Accordingly, if only information indicating whether there is a system information block corresponding to an mMTC service is included, an mMTC terminal may simultaneously receive an existing 5G service and an mMTC service without additional information. However, when an mMTC terminal uses a small transmission and reception bandwidth (i.e., the bandwidth of a CORESET is also required to be small), due to the point that a CORESET and a search space for mMTC and a CORESET and a search space corresponding to an existing 5G service are the same, there is a disadvantage in that an existing 5G terminal is also required to use a CORESET having a small bandwidth.

[Method 2]

A base station may configure a CORESET or a search space corresponding to an mMTC service to be different from that for an existing 5G service, and indicate a resource on which a system information block corresponding to an mMTC service is transmitted.

Figure 13:
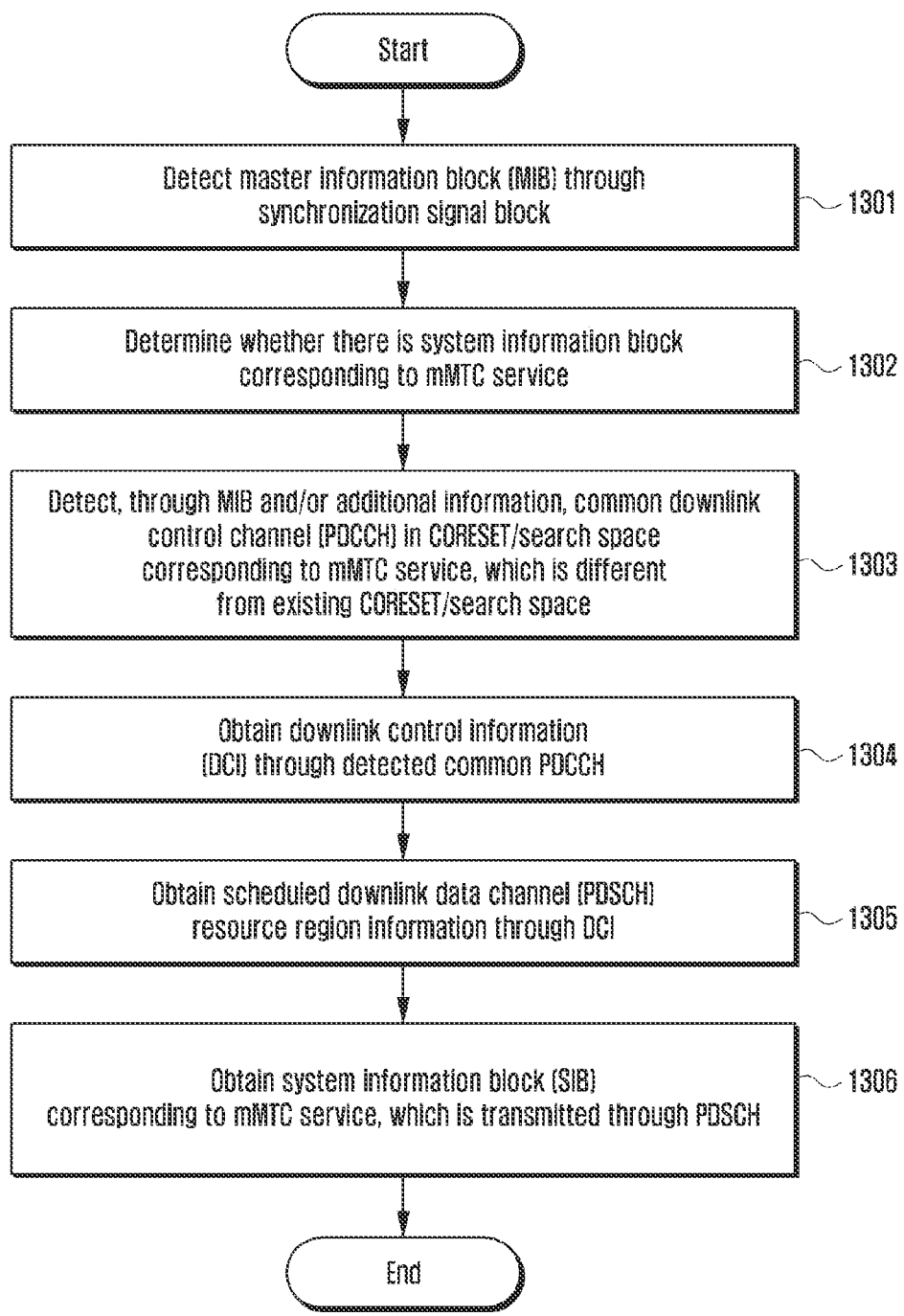
FIG. 13 is a diagram illustrating another procedure of obtaining system information of an mMTC service.

FIG. 13 is a diagram illustrating another procedure of obtaining system information of an mMTC service. According to FIG. 13, a base station periodically transmits a synchronization signal block to multiple terminals in a system, and a terminal obtains time and frequency synchronization through the synchronization signal, and receives an MIB, which is essential system information, through the PBCH (operation 1301).

An mMTC terminal determines whether there is a system information block corresponding to an mMTC service (operation 1302). The first embodiment may be referred to for a detailed determination method.

If the mMTC terminal determines that there is a system information block corresponding to an mMTC service, the mMTC terminal monitors or searches for a common PDCCH corresponding to an mMTC service in a common CORESET and/or search space different from that of an existing 5G service, based on time region and frequency region information configured for an mMTC service through the MIB and/or additional information for an mMTC service (operation 1303). In a case where the mMTC terminal has detected a common PDCCH corresponding to an mMTC service, the terminal obtains downlink control information (DCI) transmitted through the detected common PDCCH (operation 1304).

The terminal may obtain scheduling information of a downlink data channel or an uplink data channel through the received downlink control information (DCI). In other words, the DCI may include information relating to a resource region (or a PDSCH transmission region) in which the terminal is required to receive a PDSCH transmitted from the base station, or information relating to a resource region allocated by the base station to the terminal to transmit a PUSCH. The mMTC terminal obtains, through the received DCI, resource region information of PDSCH on which an mMTC SIB is transmitted (operation 1305). Various pieces of system information, which are called a system information block corresponding to an mMTC service, may be transmitted through the scheduled downlink data channel, and the mMTC terminal obtains the mMTC SIB (operation 1306).

Accordingly, the base station may flexibly configure, for the terminal, a CORESET and/or a search space for an existing 5G service and a CORESET and/or a search space for an mMTC service. That is, CORESETs and search spaces corresponding to mMTC and an existing 5G service may be differently configured by a base station, respectively. Therefore, CORESETs having different bandwidths can be configured for an existing 5G terminal and an mMTC terminal, and thus two services can be efficiently supported simultaneously.

The following methods may be considered as methods for configuring time region and frequency region information of a CORESET and a search space configured for an mMTC service.

[Method 2-1]

A base station may configure a time region and a frequency region of a CORESET and/or a search space configured for an existing 5G service, and time region and frequency region information of a CORESET and/or a search space configured for an mMTC service such that the pieces of information are associated to each other on the time and/or frequency domain. Specifically, each of a CORESET or a search space for an existing 5G service is configured to be one of pre-determined 16 configurations, based on an index value of four bits among eight bits included in an MIB. For example, in a case where the SCSs of an SSB and a PDCCH are all 15 kHz, and a minimum channel bandwidth is 5 MHz or 10 MHz, a CORESET configuration may follow Table 3 below, and in a case where a frequency band is frequency band 1 (FR 1), and an SSB and CORESET multiplexing pattern is 1, a search space configuration may follow Table 4 below. A CORESET may be configured according to a parameter of Table 3, and a monitoring occasion of a search space may be determined according to a parameter of Table 4. For example, in a case of following Table 4, slot no of a monitoring occasion (in an SFN satisfying $SFN_C$ mod 2=0 if $\lfloor (O \cdot 2^\mu + \lfloor i \cdot M \rfloor)/N_{slot}^{frame,\mu} \rfloor$ mod 2=0 is satisfied, or an SFN satisfying $SFN_C$ mod 2=1 if $\lfloor (O \cdot 2^\mu + \lfloor i \cdot M \rfloor)/N_{slot}^{frame,\mu} \rfloor$ mod 2=1 is satisfied) may be configured by $n_0 = (O \cdot 2^\mu + \lfloor i \cdot M \rfloor)$ mod $N_{slot}^{frame,\mu}$) mod $N_{slot}^{frame,\mu}$. Accordingly, a terminal monitors a PDCCH in a search space configured in two consecutive slots starting from slot no.

TABLE 3

| Index | SS/PBCH block and CORESET multiplexing pattern | Number of RBs $N_{RB}^{CORESET}$ | Number of symbols $N_{symb}^{CORESET}$ | Offset (RBs) |
| --- | --- | --- | --- | --- |
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 7 | 38 |
| 14 | 1 | 96 | 3 | 38 |
| 15 | Reserved | | | |

TABLE 4

| Index | O | Number of search space (SS) sets per slot | M | First symbol index |
| --- | --- | --- | --- | --- |
| 0 | 0 | 1 | 1 | 0 |
| 1 | 0 | 2 | ½ | {0, if i is even}{$N_{symb}^{CORESET}$, if i is odd} |
| 2 | 2 | 1 | 1 | 0 |
| 3 | 2 | 2 | ½ | {0, if i is even}{$N_{symb}^{CORESET}$, if i is odd} |
| 4 | 5 | 1 | 1 | 0 |
| 5 | 5 | 2 | ½ | {0, if i is even}{$N_{symb}^{CORESET}$, if i is odd} |
| 6 | 7 | 1 | 1 | 0 |
| 7 | 7 | 2 | ½ | {0, if i is even}{$N_{symb}^{CORESET}$, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

A CORESET or search space for an mMTC service may be configured to be associated in advance with a CORESET or search space for a 5G service configured above, and thus can be configured to avoid the resource of a CORESET or search space for an existing 5G service. By one or more methods among the following methods, the resource of a CORESET and search space for an existing 5G service may be associated with the resource of a CORESET and search space for an mMTC service.

- Configuration of a multiplexing pattern type of a CORESET corresponding to an existing 5G service and a CORESET corresponding to mMTC (a multiplexing pattern type may indicate whether the type corresponds to frequency division multiplexing (FDM) or time division multiplexing (TDM))
- Configuration of a multiplexing pattern type of a synchronization signal block and a CORERSET corresponding to mMTC
- Configuration of the number of RBs of a CORESET corresponding to mMTC
- Configuration of the number of symbols of a CORESET corresponding to mMTC
- Change of a frequency resource position of a CORESET corresponding to mMTC through an offset configuration relative to a synchronization signal block
- Change of a frequency resource position of a CORESET corresponding to mMTC through an offset configuration relative to a CORESET corresponding to an existing 5G service
- The number of search space sets corresponding to mMTC per slot
- Configuration of the first symbol index of a CORESET corresponding to mMTC
- Configuration of the first symbol index of a CORESET corresponding to mMTC through an offset configuration relative to a CORESET corresponding to an existing 5G service
- Configuration of a slot index of a search space corresponding to mMTC
- Configuration of one or more parameters for determining a slot index of a search space corresponding to mMTC The relationship between a configuration of a CORESET and/or a search space for an mMTC service and a configuration of a CORESET and/or a search space for a 5G service are configured in advance (e.g., a CORESET for a 5G service and a CORESET for an mMTC service are FDMed, and a particular RB may be determined in advance as a gap between the CORESETs). Therefore, an mMTC terminal may identify a CORESET and/or a search space for an mMTC service in a case where a CORESET and/or a search space for a 5G service is indicated. Alternatively, a CORESET and/or a search space for an mMTC service may be indicated together when a CORESET and/or a search space for a 5G service is indicated. In this case, for example, a CORESET and/or a search space for an mMTC service may be indicated together by eight bits included in an MIB. A configuration of a CORESET and/or a search space for an mMTC service according to each index may be determined in advance.

Accordingly, if a base station includes only information indicating whether there is a system information block corresponding to an mMTC service, different CORESETs and/or search spaces corresponding to an existing 5G service and an mMTC service may be both configured for an mMTC terminal without additional information.

[Method 2-2]

Time region and frequency region information of a CORESET and a search space configured for an mMTC service may be configured through an MIB and/or additional information. Specifically, each of a CORESET and/or a search space for an existing 5G service are configured to be one of 16 configurations according to a pre-configured table, based on values of four bits among eight bits included in an MIB. Similarly, each of a CORESET and/or a search space for an mMTC service is configured to be one of 16 configurations according to a pre-configured table, based on values of four bits among additional eight bits. The additional bits may be transmitted according to method 2 or 3 of the first embodiment. The number of bits described above merely corresponds to an example. Accordingly, the resource of a CORESET and/or a search space for an mMTC service may be configured by one or more methods among the following methods.

Configuration of a multiplexing pattern type of a CORERSET corresponding to an existing 5G service and a CORESET corresponding to mMTC Configuration of a multiplexing pattern type of a synchronization signal block and a CORERSET corresponding to mMTC Configuration of the number of RBs of a CORESET corresponding to mMTC Configuration of the number of symbols of a CORESET corresponding to mMTC Change of a frequency resource position of a CORESET corresponding to mMTC through an offset configuration relative to a synchronization signal block Change of a frequency resource position of a CORESET corresponding to mMTC through an offset configuration relative to a CORESET corresponding to an existing 5G service The number of search space sets corresponding to mMTC per slot Configuration of the first symbol index of a CORESET corresponding to mMTC Configuration of the first symbol index of a CORESET corresponding to mMTC through an offset configuration relative to a CORESET corresponding to an existing 5G service Configuration of a slot index of a search space corresponding to mMTC Configuration of one or more parameters for determining a slot index of a search space corresponding to mMTC According to the above method, a CORESET and a search space corresponding to an mMTC service can be configured independently to an existing 5G service, and thus it is possible to flexibly configure a CORESET and a search space corresponding to an mMTC service.

[Method 2-3]

A base station may configure, through an MIB, a CORESET for an mMTC service to be a CORESET configured for an existing 5G service, and may configure, through additional information, time region and frequency region information of a search space configured for an mMTC service. Specifically, the base station may configure, through the MIB, a CORESET for an existing 5G service to be one of 16 configurations according to a table, based on values of four bits. In addition, the base station may configure, through additional four bits, a search space for an mMTC service to be one of 16 configurations according to a pre-configured table, based on values of the four bits. The additional four bits may be transmitted to a terminal according to a method such as method 2 or method 3 of the first embodiment, and the number of bits merely corresponds to an example. The resource of a search space for an mMTC service may be configured by one or more methods among the following methods.

The number of search space sets corresponding to mMTC per slot

Configuration of the first symbol index of a CORESET corresponding to mMTC

Configuration of the first symbol index of a CORESET corresponding to mMTC through an offset configuration relative to a CORESET corresponding to an existing 5G service Configuration of a slot index of a search space corresponding to mMTC Configuration of one or more parameters for determining a slot index of a search space corresponding to mMTC According to the method, a base station may add a relatively small amount of information to configure, for an mMTC terminal, different search spaces corresponding to an existing 5G service and an mMTC service. However, CORESETs having the same bandwidth are used for a 5G service and an mMTC service, and thus there is a disadvantage in that, when an mMTC terminal uses a small transmission and reception bandwidth (i.e., the bandwidth of a CORESET is also required to be small), an existing 5G terminal is also required to use a CORESET having a small bandwidth.

[Method 2-4]

A base station may independently configure a CORESET for an mMTC service through an MIB and additional information, and may configure a search space for an mMTC service to be associated with a search space configured for an existing 5G service on the time and/or frequency domain. Specifically, the base station may configure, through the MIB, a search space for an existing 5G service to be one of 16 configurations according to a pre-configured table, based on values of four bits. In a case of a search space for an mMTC service, the search space may be configured to be associated in advance with the search space configured above, and thus can be configured to avoid the resource of a search space for an existing 5G service. The base station may configure, through additional four bits associated with an mMTC service, a CORESET for an mMTC service to be one of 16 configurations according to a pre-configured table, based on values of the four bits. The additional four bits may be transmitted to a terminal according to a method such as method 2 or method 3 of the first embodiment, and the number of bits merely corresponds to an example.

The resource of a CORESET for an mMTC service may be configured by one or more methods among the following methods.

Configuration of a multiplexing pattern type of a CORERSET corresponding to an existing 5G service and a CORESET corresponding to mMTC Configuration of a multiplexing pattern type of a synchronization signal block and a CORERSET corresponding to mMTC Configuration of the number of RBs of a CORESET corresponding to mMTC Configuration of the number of symbols of a CORESET corresponding to mMTC Change of a frequency resource position of a CORESET corresponding to mMTC through an offset configuration relative to a synchronization signal block Change of a frequency resource position of a CORESET corresponding to mMTC through an offset configuration relative to a CORESET corresponding to an existing 5G service Furthermore, by one or more methods among the following methods, the resource of a search space for an existing 5G service may be associated with the resource of a search space for an mMTC service.

The number of search space sets corresponding to mMTC per slot

Configuration of the first symbol index of a CORESET corresponding to mMTC

Configuration of the first symbol index of a CORESET corresponding to mMTC through an offset configuration relative to a CORESET corresponding to an existing 5G service Configuration of a slot index of a search space corresponding to mMTC Configuration of one or more parameters for determining a slot index of a search space corresponding to mMTC According to the method, a base station may add a relatively small amount of information to configure different CORESETs corresponding to an existing 5G service and an mMTC service. That is, when an mMTC terminal uses a small transmission and reception bandwidth (i.e., the bandwidth of a CORESET is also required to be small), a CORESET having a large bandwidth may be configured for an existing 5G terminal. In a case of an associated search space, if the positions of the resources for an existing 5G service and an mMTC service do not overlap with each other, reception efficiency can be reduced, but the reduction can be resolved by implementation of a base station.

[Method 3]

A base station may directly or indirectly schedule a PDSCH including a system information block corresponding to an mMTC service by using an MIB of an existing 5G system and information for an mMTC service.

Figure 14:
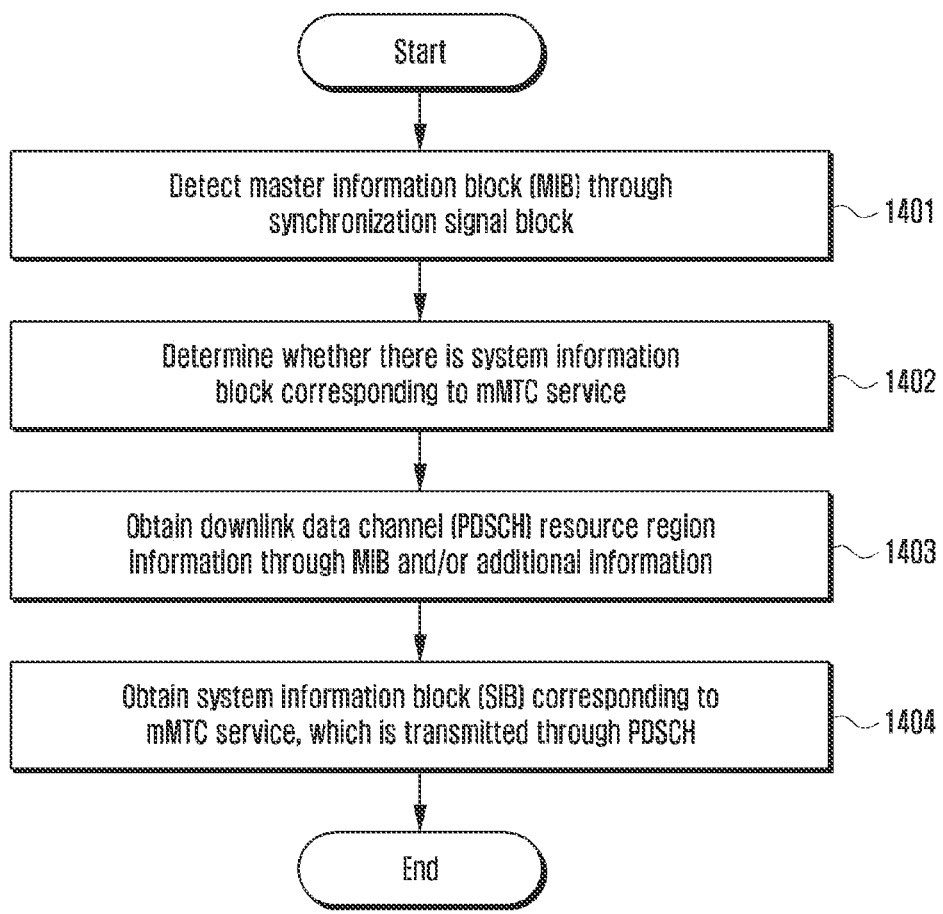
FIG. 14 is a diagram illustrating another procedure of obtaining system information of an mMTC service.

FIG. 14 is a diagram illustrating another procedure of obtaining system information of an mMTC service. According to FIG. 14, a base station periodically transmits a synchronization signal block to multiple terminals in a system, and a terminal obtains time and frequency synchronization through the synchronization signal, and receives an MIB, which is essential system information, through the PBCH (operation 1401).

An mMTC terminal determines whether there is a system information block corresponding to an mMTC service (operation 1402). The determination method may follow a method of the first embodiment. If the mMTC terminal determines that there is a system information block corresponding to an mMTC service, the mMTC terminal may obtain downlink data channel scheduling information (resource region information of PDSCH) through the MIB and/or the additional information for the mMTC service (operation 1403). In other words, unlike FIG. 12 or FIG. 13, the terminal may not obtain downlink control information (DCI), based on a CORESET and search space configuration, and may receive scheduling of a PDSCH including a system information block, based on the additional information for the mMTC service, and pre-configured pieces of information. Various pieces of system information, which are called an SIB corresponding to an mMTC service, may be transmitted through the scheduled downlink data channel, and the mMTC terminal obtains the mMTC SIB (operation 1404).

The additional information, and the pre-configured pieces of information may include one or more pieces of configuration information among the following pieces of configuration information. Resource allocation information which is not configured by a base station may be determined in advance.

Frequency domain resource assignment
Time domain resource assignment
Frequency hopping flag
Modulation and coding scheme
TBS
Number of PDSCH repetition
Periodicity of PDSCH
Location and type of DMRS (DMRS symbol)

According to the method, the mMTC terminal may obtain scheduling information of a PDSCH without detecting DCI in a CORESET and a search space. The reduction of communication modem complexity and the reduction of power consumption of a terminal for low-cost terminal implementation is one of the main goals of mMTC. According to the method, there is a limitation due to fixed PDSCH scheduling, but the complexity and power consumption of the terminal can be reduced, and thus the method is suitable for supporting an mMTC service.

In relation to the above methods, a method for, when there is a system information block corresponding to an mMTC service, indicating a resource on which the system information block is transmitted is not limited to the examples described above, and the method can be applied to a new service rather than mMTC.

Figure 15:
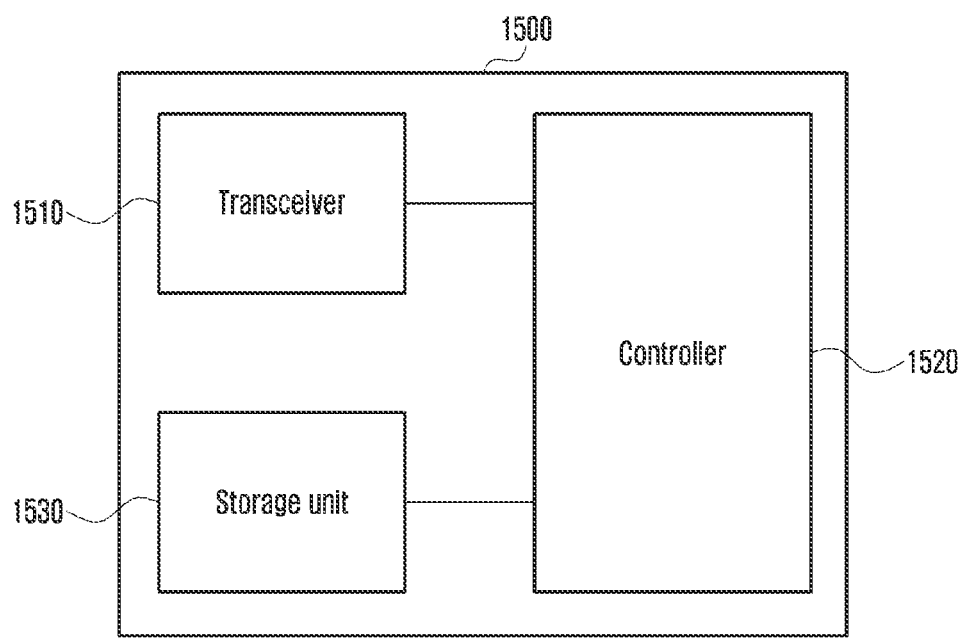
FIG. 15 is a block diagram of a terminal according to an embodiment of the disclosure.

FIG. 15 is a block diagram of a terminal according to an embodiment of the disclosure. Referring to FIG. 15, a terminal 1500 may include a transceiver 1510, a controller 1520, and a storage unit 1530. According to an efficient system information block transmission and reception method for a 5G communication system corresponding to the above embodiments, the transceiver 1510, the controller 1520, and the storage unit 1530 of the terminal 1500 may be operated. However, the elements of the terminal 1500 according to an embodiment are not limited to the above example. According to another embodiment, the terminal 1500 may also include more or fewer elements than the above elements. In addition, in a particular case, the transceiver 1510, the controller 1520, and the storage unit 1530 may be implemented in a single chip type. The transceiver 1510 may also be configured by a transmitter and a receiver according to another embodiment. The transceiver 1510 may transmit or receive a signal to or from a base station. The signal may include control information and data. To this end, the transceiver 1510 may include an RF transmitter that up-converts and amplifies a frequency of a transmitted signal, an RF receiver that low-noise amplifies a received signal and down-converts the frequency, and the like. In addition, the transceiver 1510 may receive a signal through a wireless channel and output the signal to the controller 1520, and may transmit a signal output from the controller 1520, through a wireless channel.

The controller 1520 may control a series of processes allowing the terminal 1500 to be operated according to an embodiment of the disclosure described above. For example, the controller 1520 may differently control an efficient system information block transmission and reception method, that is, a method for determining whether there is a system information block corresponding to an mMTC service, and a method for configuring a PDSCH resource of a system information block corresponding thereto according to an embodiment of the disclosure.

The storage unit 1530 may store control information or data such as a PDSCH resource configuration for a system information block included in a signal obtained by the terminal 1500, and may have a region for storing data required for control of the controller 1520, and data generated when the controller 1520 performs control.

Figure 16:
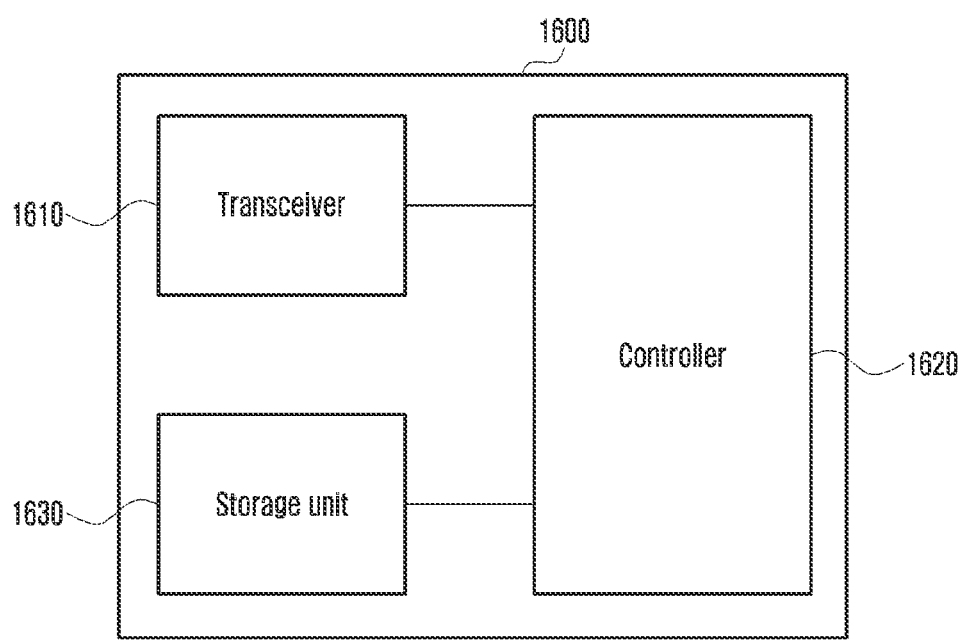
FIG. 16 is a block diagram of a base station according to an embodiment of the disclosure.

FIG. 16 is a block diagram of a base station according to an embodiment.

Referring to FIG. 16, a base station 1600 may include a transceiver 1610, a controller 1620, and a storage unit 1630. According to an efficient system information block transmission and reception method for a 5G communication system corresponding to the above embodiments, the transceiver 1610, the controller 1620, and the storage unit 1630 of the base station 1600 may be operated. However, the elements of the base station 1600 according to an embodiment are not limited to the above example. According to another embodiment, the base station 1600 may also include more or fewer elements than the above elements. In addition, in a particular case, the transceiver 1610, the controller 1620, and the storage unit 1630 may be implemented in a single chip type. The transceiver 1610 may also be configured by a transmitter and a receiver according to another embodiment. The transceiver 1610 may transmit or receive a signal to or from a terminal. The signal may include control information and data. To this end, the transceiver 1610 may include an RF transmitter that up-converts and amplifies a frequency of a transmitted signal, an RF receiver that low-noise amplifies a received signal and down-converts the frequency, and the like. In addition, the transceiver 1610 may receive a signal through a wireless channel and output the signal to the controller 1620, and may transmit a signal output from the controller 1620, through a wireless channel.

The controller 1620 may control a series of processes so that the base station 1600 can operate according to an embodiment of the disclosure described above. For example, the controller 1620 may differently control an efficient system information block transmission and reception method, that is, a method for determining whether there is a system information block corresponding to an mMTC service, and a method for configuring a PDSCH resource of a system information block corresponding thereto according to an embodiment.

The storage unit 1630 may store control information or data such as a PDSCH resource configuration for a system information block, which is determined by the base station 1600, or control information or data received from a terminal, and may have a region for storing data required for control of the controller 1620, and data generated when the controller 1620 performs control.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary.

The invention claimed is:

1. A method performed by a terminal in a wireless communication system, the method comprising:
   obtaining a synchronization signal block (SSB) transmitted by a base station;
   obtaining a master information block (MIB) from the SSB;
   identifying a control resource set (CORESET) and a search space based on the MIB:
   obtaining downlink control information (DCI) by monitoring a physical downlink control channel (PDCCH) based on the CORESET and the search space;
   obtaining information on resources of a physical downlink shared channel (PDSCH) carrying a system information block (SIB) related to machine type communication (MTC) based on the DCI; and
   obtaining the SIB related to MTC on the PDSCH, based on the information,
   wherein in case that the CORESET and the search space are commonly configured for both a PDCCH scheduling an SIB related to a legacy fifth generation (5G) service and the PDCCH scheduling the SIB related to MTC, cyclic redundancy check (CRC) of the DCI is scrambled by a machine type communication-radio network temporary identifier (MTC-RNTI).

2. The method of claim 1, further comprising:
   identifying whether the SIB related to MTC is transmitted, based on a physical broadcast channel (PBCH) payload of the SSB.

3. The method of claim 1, further comprising:
   identifying a resource region related to the SSB, based on a resource on which the SSB is transmitted; and
   obtaining information for obtaining the SIB related to MTC from the resource region related to the SSB.

4. The method of claim 1, wherein in case that the CORESET and the search space are configured for the PDCCH scheduling the SIB related to MTC, the CORESET and the search space do not overlap with a CORESET and a search space for the PDCCH scheduling the SIB related to the legacy 5G service.

5. The method of claim 1, further comprising:
   identifying whether the SIB related to MTC is transmitted, based on an initial value for generating a sequence of a physical broadcast channel (PBCH) demodulation reference signal (DMRS).

6. A method performed by a base station in a wireless communication system, the method comprising:
   generating a master information block (MIB) including information on a control resource set (CORESET) and a search space;
   transmitting a synchronization signal block (SSB), based on the generated MIB;

transmitting a physical downlink control channel (PDCCH) including downlink control information (DCI) based on the CORESET and the search space;

generating a system information block (SIB) related to machine type communication (MTC); and transmitting the SIB related to MTC on a physical downlink shared channel (PDSCH), wherein resources of the PDSCH on which the SIB related to MTC is transmitted is indicated based on the DCI, and, and wherein in case that the CORESET and the search space are commonly configured for both a PDCCH scheduling an SIB related to a legacy fifth generation (5G) service and the PDCCH scheduling the SIB related to MTC, cyclic redundancy check (CRC) of the DCI is scrambled by a machine type communication-radio network temporary identifier (MTC-RNTI).

7. The method of claim 6, wherein, a physical broadcast channel (PBCH) payload of the SSB comprises an indicator indicating whether the SIB related to MTC is transmitted.

8. The method of claim 6, further comprising:

identifying a resource region related to the SSB, based on a resource on which the SSB is transmitted; and transmitting information for obtaining the SIB related to MTC in the resource region related to the SSB.

9. A terminal in a wireless communication system, the terminal comprising:

a transceiver; and a controller connected to the transceiver and configured to:

obtain a synchronization signal block (SSB) transmitted by a base station, obtain a master information block (MIB) from the SSB, identify a control resource set (CORESET) and a search space based on the MIB, obtain downlink control information (DCI) by monitoring a physical downlink control channel (PDCCH) based on the CORESET and the search space, obtain information on resources of a physical downlink shared channel (PDSCH) carrying a system information block (SIB) related to machine type communication (MTC) based on the DCI, and obtain the SIB related to MTC on the PDSCH, based on the information, wherein in case that the CORESET and the search space are commonly configured for both a PDCCH scheduling an SIB related to a legacy fifth generation (5G) service and the PDCCH scheduling the SIB related to MTC, cyclic redundancy check (CRC) of the DCI is scrambled by a machine type communication-radio network temporary identifier (MTC-RNTI).

10. The terminal of claim 9, wherein the controller is further configured to identify whether the SIB related to MTC is transmitted, based on a physical broadcast channel (PBCH) payload of the SSB.

11. The terminal of claim 9, wherein the controller is further configured to:

identify a resource region related to the SSB, based on a resource on which the SSB is transmitted, and obtain information for obtaining the SIB related to MTC from the resource region related to the SSB.

12. A base station in a wireless communication system, the base station comprising:

a transceiver; and a controller connected to the transceiver and configured to:

generate a master information block (MIB) including information on a control resource set (CORESET) and a search space, transmit a synchronization signal block (SSB), based on the generated MIB, transmit a physical downlink control channel (PDCCH) including downlink control information (DCI) based on the CORESET and the search space, generate a system information block (SIB) related to machine type communication (MTC), and transmit the SIB related to MTC on a physical downlink shared channel (PDSCH), wherein resources of the PDSCH on which the SIB related to MTC is transmitted is indicated based on the DCI, and, and wherein in case that the CORESET and the search space are commonly configured for both a PDCCH scheduling an SIB related to a legacy fifth generation (5G) service and the PDCCH scheduling the SIB related to MTC, cyclic redundancy check (CRC) of the DCI is scrambled by a machine type communication-radio network temporary identifier (MTC-RNTI).

13. The base station of claim 12, wherein a physical broadcast channel (PBCH) payload of the SSB comprises an indicator indicating whether the SIB related to MTC is transmitted.

14. The base station of claim 12, wherein the controller is further configured to:

identify a resource region related to the SSB, based on a resource on which the SSB is transmitted, and transmit information for obtaining the SIB related to MTC in the resource region related to the SSB.

* * * * *